United States Patent
Kenner

(12) 
(10) Patent No.: US 6,419,601 B1
(45) Date of Patent: Jul. 16, 2002

(54) SQUEEZE ACTUATED HAND INTERFACE SYSTEMS FOR ROTATABLE ITEMS

(76) Inventor: Allen D. Kenner, 995 Park St., Ashland, OR (US) 97520

( * ) Notice: Subject to any disclaimer, the term of this patent is extended or adjusted under 35 U.S.C. 154(b) by 0 days.

(21) Appl. No.: 09/289,294

(22) Filed: Apr. 9, 1999

(51) Int. Cl.[7] ............................................. A63B 49/08
(52) U.S. Cl. ...................... 473/552; 473/560; 81/177.1; 81/489; 16/110 R; 440/101
(58) Field of Search ...................... 473/549, 552, 473/551, 295, 560; 81/177.1, 177.7, 489; 16/110 R; 440/101

(56) References Cited

U.S. PATENT DOCUMENTS

| | | | | |
|---|---|---|---|---|
| 1,544,226 A | * | 6/1925 | De Bus | 473/295 |
| 3,343,577 A | * | 9/1967 | Wagner | 81/177.1 |
| 3,534,960 A | * | 10/1970 | Hanks | 473/551 |
| 3,940,134 A | * | 2/1976 | Bieganowski | 473/560 |
| 4,033,583 A | * | 7/1977 | Ehrhart | 473/523 |
| 4,101,125 A | * | 7/1978 | Heath | 473/552 |
| 4,365,807 A | * | 12/1982 | Melby | 473/295 |
| 4,693,475 A | * | 9/1987 | Keilhau | 473/552 |
| 4,709,602 A | * | 12/1987 | Grabovac et al. | 81/177.1 X |
| 4,729,271 A | * | 3/1988 | Kenigson | 81/489 X |
| 4,785,495 A | * | 11/1988 | Dellis | 81/489 X |
| 4,820,216 A | * | 4/1989 | Masters | 440/101 |
| 5,115,530 A | * | 5/1992 | Distiso | 81/489 X |
| 5,538,476 A | * | 7/1996 | Riverman | 473/295 |

* cited by examiner

Primary Examiner—Raleigh W. Chiu

(57) ABSTRACT

Hand interfaces (11), (111), (188), (201*a*), (201*b*), (202*a*), (202*b*), (204), (211), (311), (411), (511), (611), (711), (811), and (911), which improve the performance of many items including: racquets for tennis and other sports; rotary hand tools such as screwdrivers; hockey sticks; and kayak oars. Relative rotation between one of the hand interfaces and a corresponding implement is selectively stopped, and torque is selectively transmitted between the hand interface and the implement, when a user squeezes the implement's handle. The hand interface can be rotated in either direction on the implement, and relative movement stopped at an infinite number of positions. The hand interface amplifies the opposing effects of either a firm grasp or a relaxed grasp. Tactile indicator systems (36) with (38), and (236*a,b*) with (238*a,b*), glove (204), as well as handle grips (611), (711), (811), and (911) which rotate on noncircular shafts, enable users to accurately determine rotational positions of the implement to the hand interface. For additional ease of use, adjustable end-stop systems (273*a,b*) with (275*a,b*), or (73*f,b*) with (86*f,b*) limit the range of rotation between the hand interface and the implement

24 Claims, 10 Drawing Sheets

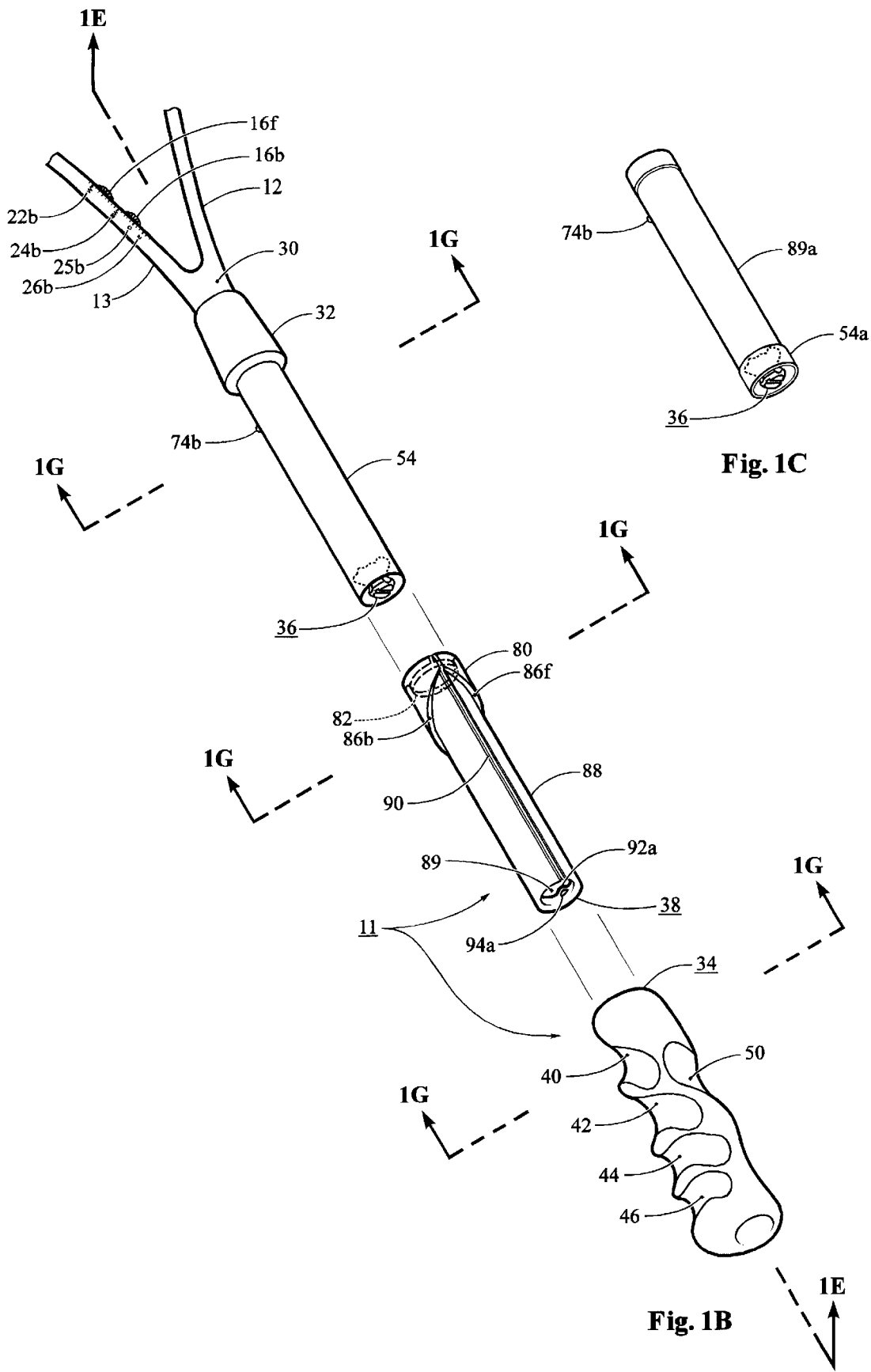

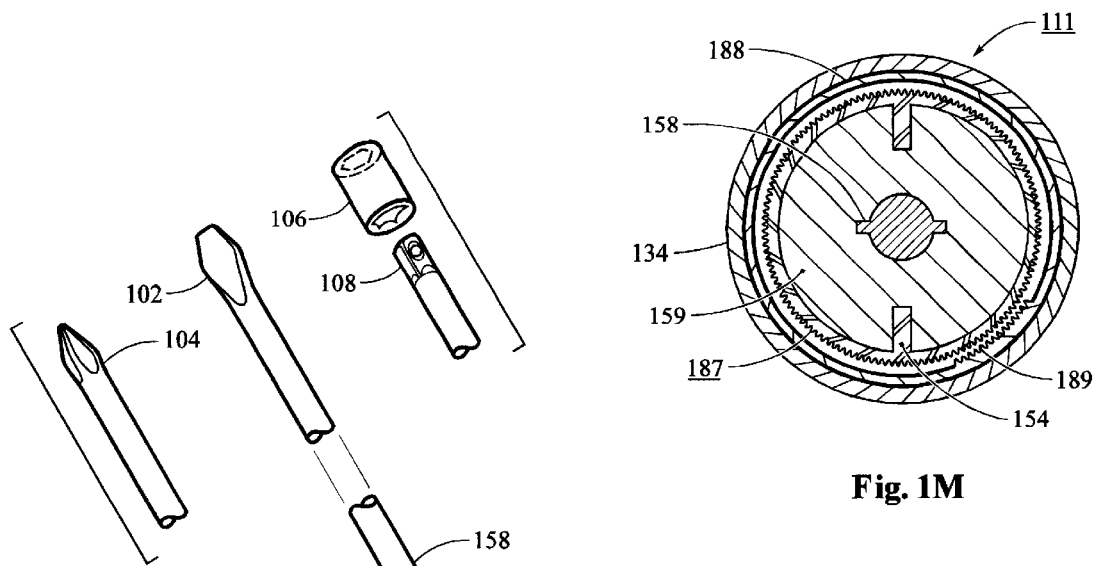
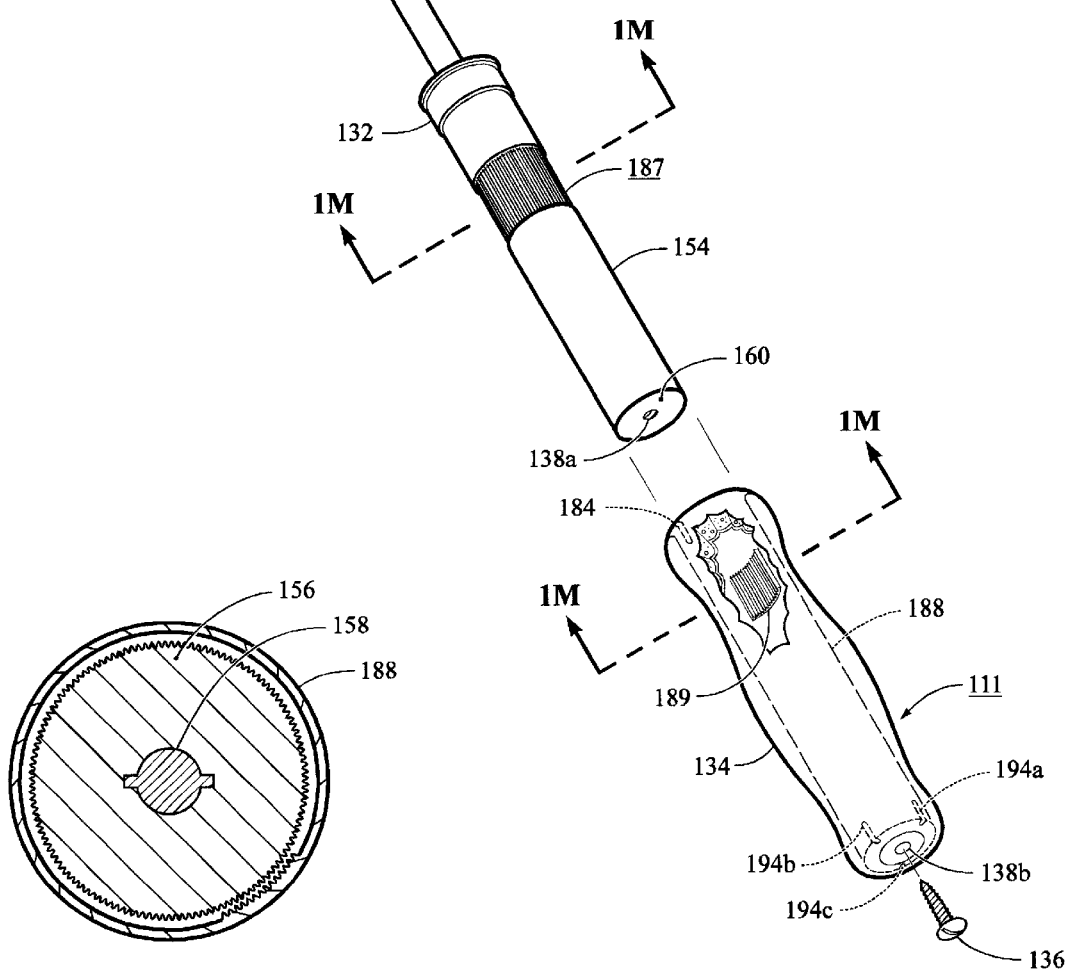
Fig. 1N
Fig. 1K
Fig. 1M

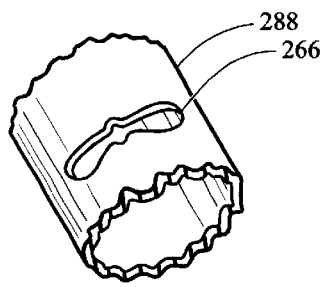
Fig. 2H
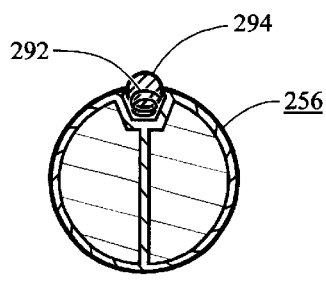
Fig. 2G
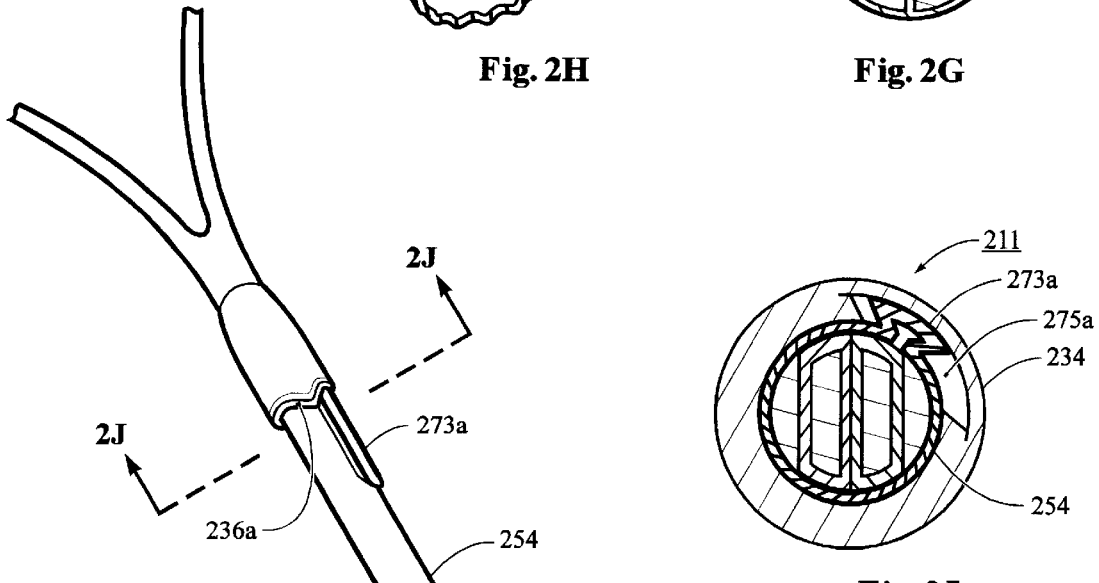
Fig. 2J
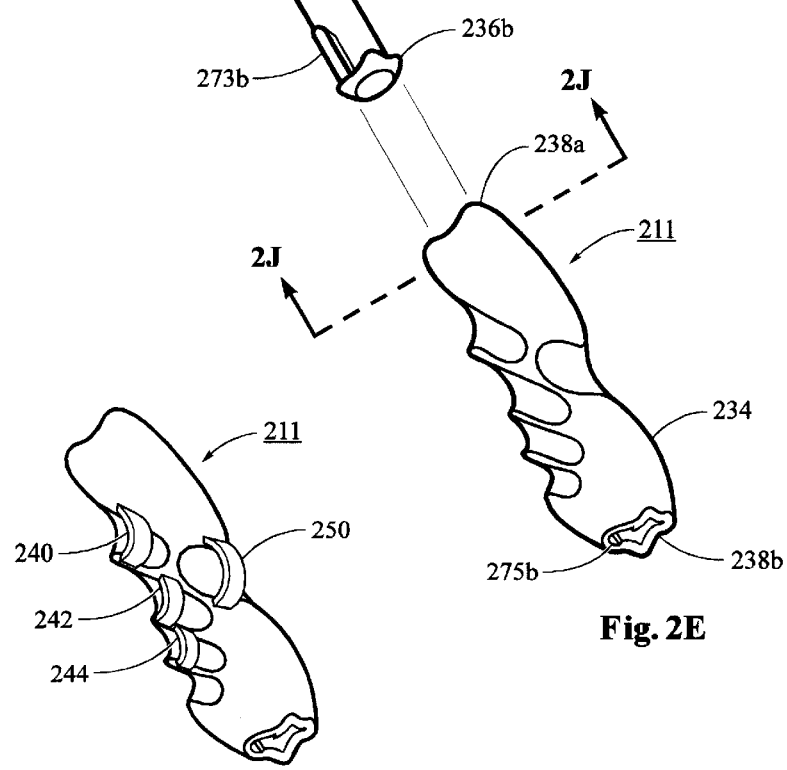
Fig. 2E
Fig. 2F

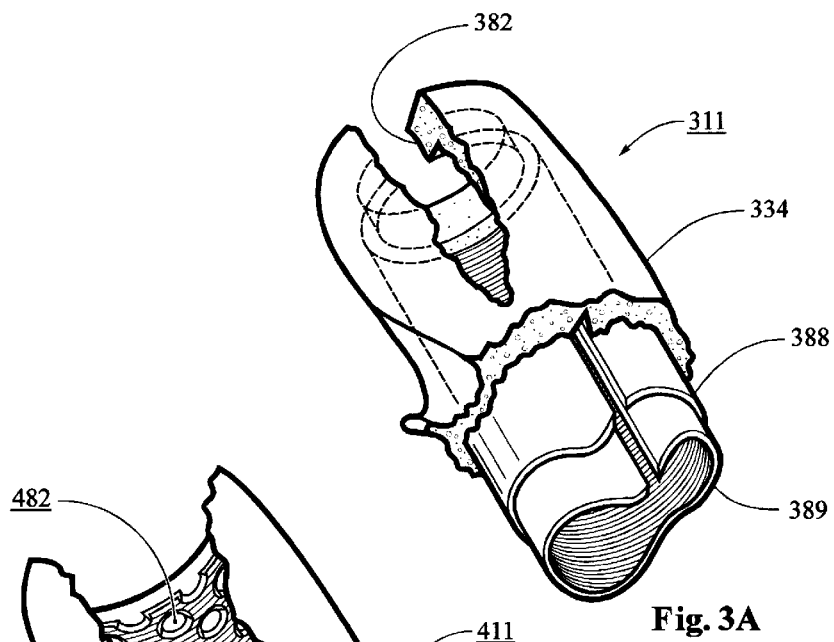
Fig. 3A
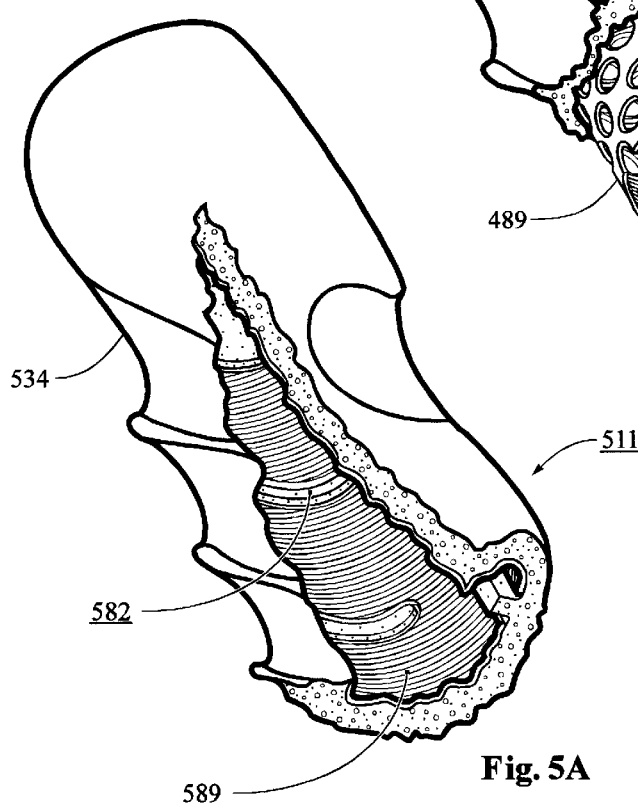
Fig. 4A
Fig. 5A

SQUEEZE ACTUATED HAND INTERFACE SYSTEMS FOR ROTATABLE ITEMS

BACKGROUND

1. Field of Invention

This invention relates to rotatable handle grips that improve the performance of a broad range of items including tennis racquets, hockey sticks, kayak oars, and rotary hand tools.

2. Description of Prior Art

Although this invention can be applied to many items, only two types of items, tennis racquets and screwdrivers, will be discussed in detail since they represent a broad range of possible applications.

In the game of tennis a racquet is usually rotated to different positions relative to a players hand when preparing for backhand, forehand or volley shots. Most players utilize more than one grip position for each of those shots. For example, when hitting a backhand shot the player can impart either slice (underspin) or topspin (overspin) to the ball, but each shot can be performed more efficaciously using different grip positions.

Different grip positions determine the degree of angular racquet head displacement relative to a player's hand This determines the angle of the racquet face relative to the ground at the moment of impact with a tennis ball during a tennis stroke. A topspin shot would require a slightly acute angle, while a slice shot would require a somewhat obtuse angle. This rotational displacement can be controlled by a rotatable handle grip that can provide a player with increased accuracy, control, power, consistency, hand comfort and decreased response time. However, rotatable handle grips that can be locked in only a limited number of predetermined positions, or that cannot be adjusted easily and instantaneously during play, are inefficacious because they limit not only the types of shots a player can make but the quality of play in general.

Rotatable handle grips also improve the performance of many hand tools that require rotation, such as screwdrivers. Such rotatable handle grips usually operate with a ratcheting mechanism, allowing the handle grip to rotate freely about the shaft of a tool in only one direction at a time. When the user rotates the handle grip in the opposite direction, the tool rotates with the handle grip. If a user wishes to rotate the tool in the opposite direction, he must slide or twist a setting switch prior to use, a time consuming and bothersome procedure. Manufacture and assembly of the numerous moving parts is relatively complex, resulting in production costs far above that of conventional stationary handle grip screwdrivers.

Previous rotatable handle grips suffered from the above-mentioned problems as well as these discussed below.

U.S. Pat. No. 2,019,512 to Marsh (1936) discloses a golf club handle which had to be "set" in position. This involved a cumbersome and time-consuming process; a user was required to loosen a nut at the base of the handle, disengage a toothed mechanism, estimate where the desired setting might be, reengage the teeth, and finally retightening the base nut Consequently, this handle grip mechanism could not provide any benefit if applied to a tennis racquet since the user would be unable to rotate the handle grip to different positions during play.

Marsh's handle could not provide a ratcheting effect, or selectively transfer torque, thereby making it equally non-beneficial for screwdrivers.

U.S. Pat. No. 4,693,475 to Keilhau (1987) shows a tennis racquet similar to Marsh's. In Keilhau's, however, the clutch comprises an acutely angled conical component on the handle shaft, and a corresponding funnel shape on the handle grip. Keilhau's handle grip was an improvement over Marsh's handle grip in that it could be set in an infinite number of positions because it possessed no teeth; nonetheless, it provided no means for rotating the handle grip to different positions during play.

German patent DE 35 10598 A1 to Pankonin (1986) shows a handle grip similar to Keilhau's, but Pankonin's provides a powerful tension spring rather than a locking nut, and less acutely angled clutch surfaces. Unfortunately, the spring tension required to prevent axial rotation of the racquet during off-center shots was enormous; this made quick handle grip position changes during play nearly impossible.

In U.S. Pat. No. 3,534,960 to Hanks (1970), a rotatable tennis racquet handle grip was proposed which could be locked in only three predetermined positions. Hanks' handle grip was also complicated to operate. The user was required to perform three precisely timed sequential operations in order to change from one grip setting to another. First a spring loaded dog-pin mechanism had to be "unlocked" by depressing a thumb tab. Next the user rotated the grip about the handle. The user then had to release the thumb tab at precisely the correct spot to situate the dog-pin into one of three hole settings. Since the handle grip was normally in a locked position, if the user applied rotational force to the handle grip prior to depressing the thumb tab, the mechanism could jam; even worse, the dog-pin or opposing parts could shear or bend. Likewise, if the user did not release the thumb tab at, or immediately prior to the desired hole setting while rotating the handle grip, it could lock in the wrong position, or not even lock at all.

The preferred Hanks' embodiment, containing only three settings, created an inflexible system. The rotational displacement between each setting was overly large; very small changes in angular displacement are needed. Without such control the racquet-face will not be at the correct angle relative to the ground at the moment of impact with a ball during a tennis stroke. Adding more holes would have confused the user; there was no way to quickly and easily distinguish among even the few settings which were provided. Too many holes would have also greatly increased the chance of part failure due to shear; the greater the number of holes, the smaller each hole would need to be to remain separated, and the thinner the dog-pin would need to be.

Finally, Hanks' mechanism did not address the extremely important factor of user compatibility. The user was forced to delicately place his thumb on a tab longitudinally along the handle grip. The thumb had to remain there for much of the time during play in order to be prepared for quick changes of grip positions. When gripping the handle in such an awkward and unnatural manner, it is extremely difficult to maintain a firm grip and control of the racquet when hitting a tennis ball. Furthermore, a player could inadvertently unlock the handle grip from its setting; there is a natural tendency to squeeze the handle grip of a tennis racquet more firmly at the moment the racquet impacts the ball. If the mechanism for changing grip positions is cumbersome, time consuming, unreliable, and distracting to use, it is not appropriate for use in a game which requires intense concentration and nearly instantaneous grip changes.

Hanks' tennis racquet handle grip mechanism was also inappropriate for performing a ratcheting effect on screwdrivers.

In U.S. Pat. No. 4,101,125 to Heath (1988) a rotatable tennis racquet handle grip was proposed. It employed a spring loaded grip-sleeve with a peg and grove locking mechanism. The handle grip had only two settings—forehand and backhand As mentioned earlier, a handle grip that provides only a limited number of predetermined positions is inefficacious.

Adding many positions would not be possible; the mechanism necessitates a large rotational displacement between positions in order to prevent part failure due to shear. Furthermore, the user would be unable to easily and quickly distinguish between positions, and accurately reengage the locking peg in a desired slot.

The mechanism increased response time during play and was also susceptible to jamming. The user was required to "unlock" the handle grip by moving it longitudinally up the racquet shaft prior to rotating the handle grip to a new position. This extra motion increased the amount of time needed to change from one grip position to another. In many circumstances during play, the grip change could not be performed in time to hit the ball. If the player, in his haste, attempted to rotate the handle grip prior to "unlocking" it, the mechanism could jam.

The handle grip relied on a spin to keep it "locked" in position during play. As a consequence, the user experienced uncomfortable vibration from the handle grip when hitting a tennis ball.

Still another barrier to the use of Heath's grip was the extreme awkwardness and discomfort it presented to players who use a "two-handed grip". In order to change grip positions with Heath's handle grip, such players were required to remove one of their hands from the grip, and place it on the racquet shaft, move the handle grip longitudinally up the shaft of the racquet, and regrasp the handle grip with both hands. Such a process is cumbersome and time consuming.

As with other racquet handle grips, Heath's handle grip was also inappropriate for performing a ratcheting effect on screwdrivers.

U.S. Pat. No. 4,365,807 to Melby (1982) shows a golf club with rotatable handle which could be adjusted during use. To operate the handle, a user was required to first "unlock" the grip. That was accomplished by moving the handle grip longitudinally up the golf club shaft, thereby disengaging a spring-loaded toothed locking system. The user then rotated the handle grip relative to the golf club, and allowed the spring to reengage the mechanism in the desired position. As with Heath's handle grip, this method was both time consuming and cumbersome because it forced the user to effectuate both longitudinal and rotational movement to change settings. Additionally, the nature of the tooth mechanism with its finite number of teeth necessitated a large racquet head angular displacement between each setting which, as mentioned previously, is not practicable for racquet applications. This grip mechanism also suffered from vibration during use, primarily caused by the spring.

In the form presented, Melby's handle grip would be ineffective for producing a ratcheting effect on screwdrivers. If the spring action was reversed, a ratcheting effect could be accomplished. Such a mechanism, however, was already described in U.S. Pat. No. 2,712,765 to Knight (1955), discussed below.

U.S. Pat. No. 4,854,596 to Carbonetti (1989) shows a tennis racquet with an angularly adjustable handle grip. Carbonetti combined the mechanisms of Melby's and Heath's handle grips, but reversed the direction of both the spring action and engagement of the locking mechanism. Consequently, Carbonetti's handle grip experienced the same limitations found in the handle grips of Melby and Heath. Moreover, the handle grip was more difficult to use; it needed a powerful spring to prevent partial disengagement of the locking mechanism due to centripetal force incurred during a stroke.

U.S. Pat. No. 4,943,058 to Carbonetti (1990), a tennis racquet with a fixed grip and moveable frame, utilized the same mechanisms as Melby's golf club with rotatable handle, and resulted in the same limitations.

U.S. Pat. No. 4,033,593 to Erhart (1977), a tennis racquet with a slip clutch handle, did not permit the user to quickly rotate the handle to desired grip positions and prevent relative rotation between the handle grip and the racquet Rather, the mechanism merely acted as a rotary shock absorber; rotational movement of the handle grip occurred when the playing ball struck on or near the frame at either side of the racquet head.

As with other racquet handle grips, Erhart's handle grip was also inappropriate for performing a ratcheting effect on screwdrivers.

U.S. Pat. No. 2,712,765 to Knight (1955) shows a rotatable handle grip for hand tools. The user was required to apply longitudinal force against the handle grip with simultaneous resistance against the head of the tool. Such force would overcome the resistance of an internal spring, thereby meshing the teeth of opposing parts; rotational force could then be transmitted from the handle grip to the tool. Clearly, the mechanism could not be applied to racquet handle grips or the like; there would be no way to prevent rotation of the racquet relative to the handle grip during play.

Although a ratcheting effect could be accomplished with this handle grip, there were limitations to its use; i.e. the tool had to encounter resistance when longitudinal force was applied to the handle grip. Also, when used to screw or unscrew long bolts, the user experienced undue effort; prior to each rotation the user was required to overcome the force of the spring. Such a motion repeated many times could be fatiguing as well as time consuming.

OBJECTS AND ADVANTAGES

Accordingly, the invention has one or more of the objects and advantages of both the rotatable handle grips described above, and the following:

1. To provide a hand powered means of both amplifying the gripping ability of a hand when firmly squeezing, and amplifying the ease in which an item can be rotated when the and is still holding on to it.
2. To provide an interface between a user's hand and an item embodying the utmost simplicity in design; a device with only one moving part, a handle grip or glove, that stops or allows its own rotation about the shaft of an implement.
3. To provide a rotatable handle grip or band interface embodying the utmost simplicity in operation by:
   (a) functioning in almost precisely the same manner as a human hand;
   (b) requiring only one almost instantaneous motion effectuated by either firmly squeezing or relaxing had pressure upon the handle grip to respectively stop or allow its rotation about the shaft of an implement;
   (c) functioning without pressing levers or longitudinal movements of the handle grip along the shaft of the implement; and,
   (d) requiring very little time or effort to learn to use.

4. To provide squeezably stopable rotary handle grips and gloves for many different implements such as tennis racquets, hockey sticks, kayak oars, and screwdrivers, in order to improve the performance of such items.
5. To provide gloves which allow users to easily glide or rotate implements in their hands when using normal gripping pressure, yet provide incredible gripping power when the implements are grasped firmly.
6. To provide a teaching or learning tool for beginning level tennis players which enables them to quickly and easily learn:
   (a) what are common grip positions;
   (b) what effect different grip positions have on a tennis ball after it is struck, such as its flight path and spin; and,
   (c) to switch from one grip position to another.
7. To provide a tool to help and encourage tennis players to remember to change their grip position for different types of shots.
8. To provide rotatable handle grips which are less likely to experience jamming or failure of parts compared to existing rotatable handle grips.
9. To provide rotatable handle grips which remain in an unlocked position when not firmly squeezed, thereby increasing ease and speed of rotational grip position changes.
10. To provide a hand powered hand interface which selectively amplifies torque transfer between a user's hand and an implement through a squeeze actuated tooth meshing system or frictional brake system.
11. To provide an infinite number of possible rotational grip positions through a squeeze actuated frictional brake system.
12. To provide rotatable handle grips which allow constant hand to handle grip contact without relative movement between the two when rotating the handle grip about the shaft of an implement resulting in:
    (a) less time, thought, and effort required to effect rotational grip changes than required with existing handle grips;
    (b) a handle grip which is ideally suited to having a contoured surface to ergonometrically fit and position a user's hand;
    (c) greater control over the implement than with a stationary handle grip; and,
    (d) less rubbing and chaffing of the ski of the hand than occurs when using a stationary handle grip, especially one with a tacky or high friction surface.
13. To provide squeezably stopable rotary handle grips with contoured surfaces to increase the area of hand to handle grip contact and provide physical barriers to hand and finger movement, resulting in:
    (a) greater comfort and control in wielding and maneuvering an implement;
    (b) a reduction in the incidence of hand slippage and blisters;
    (c) a reduction in hand fatigue—a user can wield an implement while grasping the handle grip very loosely;
    (d) greater ease in rotating the handle grip about the shaft of an implement because firm gripping pressure is not needed, thereby helping to prevent accidental, unwanted, squeeze actuated rotation stoppage of the handle grip;
    (e) a reduction in the severity of physical trauma to a user's hands and joints because impact forces are distributed over a greater hand area than with conventional handle grips; and,
    (f) greater transmission of torque with minimal squeezing effort whereby,
       a tennis player can better resist twisting of a racquet in his hand when a tennis ball strikes the racquet head off center or on its frame, and
       a screwdriver or similar rotary hand tool operates more efficiently, not relying solely on the user's grip strength to twist a screw.
14. To provide a squeezably stopable rotary handle grip for a racquet with ergonometrically contoured surfaces which:
    (a) eliminates the need for instruction on how to best grasp the handle grip by positioning a player's hand in precisely the same optimal hand gripping position every time the racquet is used;
    (b) allows the racquet to function as a more natural and effective extension of a user's arm;
    (c) permits a user to produce greater gripping pressure from each finger than when grasping a conventional racquet; and,
    (d) improves a user s consistency of play by allowing greater control of the racquet when striking a ball very hard.
15. To provide adjustable relative rotational grip position indicators to improve the accuracy, versatility and practicability of rotatable handle grips for implements such as tennis racquets by:
    (a) enabling a user to tactually sense different grip positions, especially the volley position for tennis racquets; and,
    (b) allowing a user to select from an infinite number of positions and accurately locate a desired position during play.
16. To provide an end-stop system for a rotatable handle grip on an item such as a tennis racquet which:
    (a) restricts the range of relative rotation between the handle grip and the implement:
    (b) allows a player to set extreme forehand and extreme backhand rotational grip positions;
    (c) can be steplessly adjusted and set to a player's specifications before, during or after use of the racquet; and,
    (d) improves a player's consistency and response time by providing the predominant grip positions for ground stroke, extreme forehand and backhand positions, very quickly, accurately and easily—obtaining the same positions every time the racquet is rotated relative to the handle grip clockwise or counterclockwise as far as it will go.
17. To provide rotatable handle grips which can be easily, comfortably and effectively employed by players who grasp a handle grip with two hands when changing rotational grip positions.
18. To provide rotatable handle grips, for implements such as tennis racquets, which have superior shock absorbing and vibration dampening characteristics to previous rotatable handle grips because:
    (a) there are fewer moving parts to vibrate against each other;
    (b) elements of the handle grips in contact with the racquet shaft fit snugly around the shaft exerting a constant but slight pressure so as to not vibrate against the shaft;

(c) the handle grip comprises shock absorbing materials of different densities, thicknesses and flexibilities which dampen vibration synergistically; and, (d) shock and trauma normally transmitted to a player's hand when a ball strikes the racquet head off center or on its frame, can be significantly reduced if the player grasps the handle grip less firmly than usual to allow the racquet head to rotate on impact—control of the racquet is maintained since the grip does not slide out of the user's hand (although not desirable for normal play, this technique can be used by individuals concerned with joint injuries).

19. To provide rotatable handle grips which are lightweight and do not adversely affect the weight distribution and balance of implements.

20. To provide modular snap-on/off handle grips which:
    (a) can be made in a wide variety of sizes, shapes, colors, materials and textures;
    (b) can be quickly and easily replaced when worn out, thereby eliminating the need for grip wrapping tapes which are time consuming and bothersome to apply.

21. To provide rotatable handle grips which are simple and inexpensive to manufacture.

22. To provide rotatable handle grips for screwdrivers and other rotary hand tools which can produce a ratcheting effect, allowing a user to instantly switch between clockwise and counterclockwise directions without moving or depressing any buttons, tabs or levers, and has fewer parts than existing ratcheting tools.

Further objects and advantages of the invention will become apparent from a consideration of the drawings and ensuing descriptions of them.

DRAWING FIGURES

FIG. 1B is a partially exploded view of the embodiment shown in FIG. 1A (Forehand position)

FIG. 1C is a perspective view of an alternative configuration of tube 54.

FIG. 1K is a partially exploded view of a screwdriver with a squeeze actuated torque transmitting rotary handle grip.

FIG. 1M is a cross-sectional view of FIG. 1K at the toothed brake.

FIG. 1N is a cross-sectional view of a simplified version of the item in FIG. 1M.

FIG. 2E is a partially exploded view of a rotatable handle grip and racquet shaft with stationary end-stops.

FIG. 2F is a perspective view of a handle grip with finger restraints.

FIG. 2G is a cross-sectional view of a male component of an alternate tactile indicator.

FIG. 2H is a cut-away perspective of a female component for the item in FIG. 2G.

FIG. 2J is a cross-sectional view of the item in FIG. 2E.

FIG. 3A is a cut-away perspective of a handle grip with a foam rubber glide at each end.

FIG. 4A is a cut-away perspective of a handle grip with a field of foam rubber dot glides.

FIG. 5A is a cut-away perspective of a handle grip with anatomically oriented foam rubber glides.

REFERENCE NUMERALS IN DRAWINGS

Figure 1A:
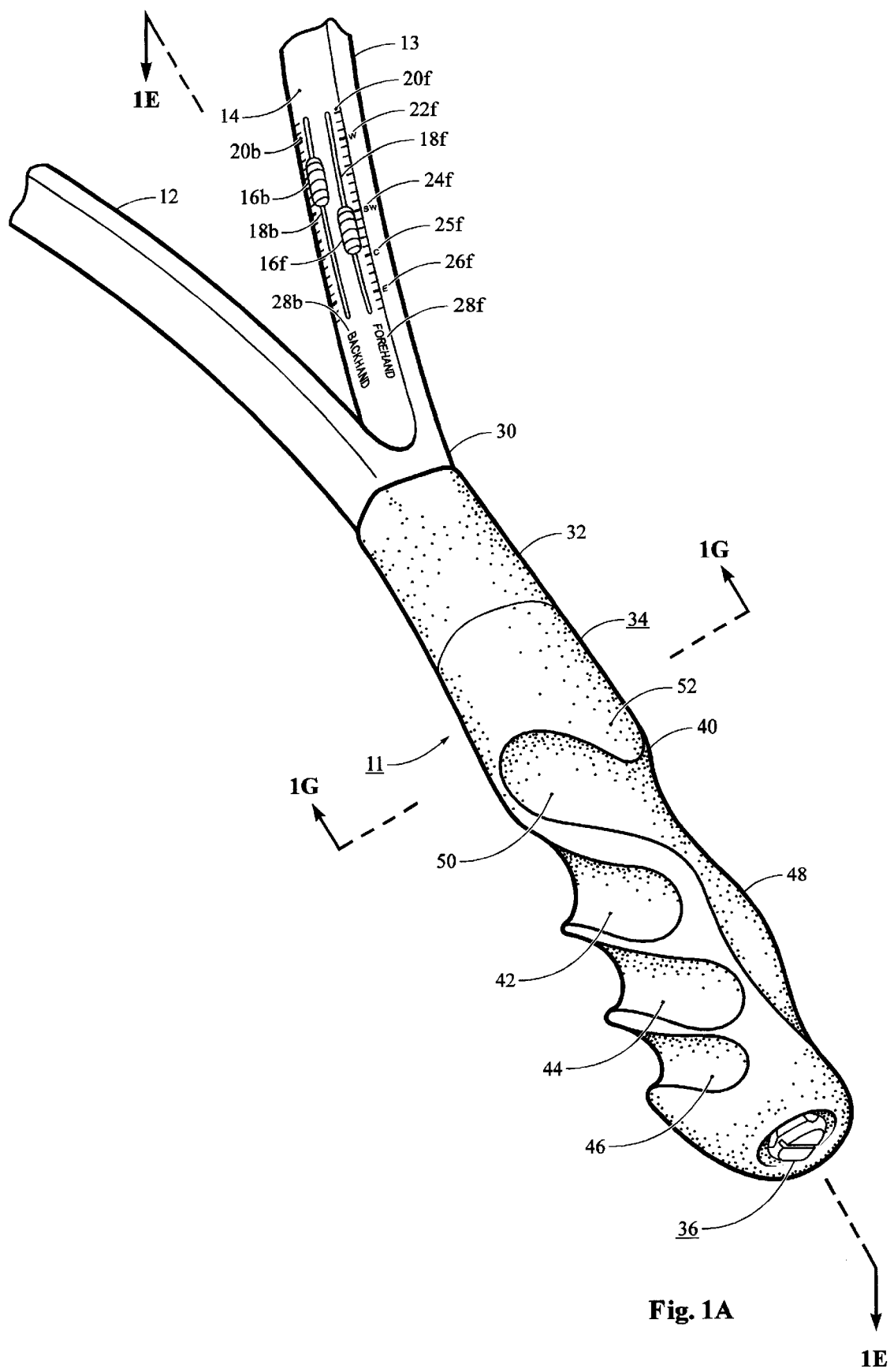
FIG. 1A is a perspective view of a snap-on/off rotatable contoured tennis racquet handle grip with adjustable grip position tactile indicator and adjustable rotational end-stops for forehand and backhand strokes. (Forehand position)

11 Rotatable handle grip for a tennis racquet
12 Left arm of bifurcated tennis racquet throat
13 Right arm of bifurcated tennis racquet throat
14 Face of arm 13 opposite to arm 12
16f Striated rotational end-stop adjustment slide-tab for forehand strokes
16b Striated rotational end-stop adjustment slide-tab for backhand strokes
17f,b Tab fins (forehand and backhand)
18f,b Slots for fins 17f,b
19f,b Snap-in-rods
20f,b Grip position calibrations
22f,b Western grip position calibration symbols
24f,b Semi-western grip position calibration symbols
25f,b Continental grip position calibration symbols
26f,b Eastern grip position calibration symbols
28f,b Grip designations of glide tabs 16f and 16b
30 Throat base/top end of racquet shaft
32 Stationary foam rubber overgrip
34 Contoured foam rubber overgrip covering
36 Racquet component of a snap-on/off rotational glide and tactile grip position indicator
38 Inwardly curled grip-sleeve component fitting to component 36
40 Depression for index finger of right hand
42 Depression for middle finger of right hand
44 Depression for ring finger of right hand
46 Depression for pinky finger of right hand
48 Bulge for palm of right hand
50 Depression for thumb of right hand
52 Wedge shaped area formed between depressions 40 and 50

54 Circular tube with threading on inside to mesh with component 36
54a Alternate configuration of part 54
55 Shock absorbing bonding agent
56 Structural shell of the tennis racquet
58 Structural spine of the racquet shaft
59 Inner core foam
60 Flat curvilinear equilateral triangular slotted face with curvilinear vertices
61 Prong and wedge spreading bevel
62 Wedge retaining bevel
64 Prong thrust-stop bevel
66a,b,c Volley grip position tactile indicator channels in bevels 62 and 64
68 Threaded tapered tube section
70f,b Flexible slide-tubes joining slide-tabs 16f,b to end-stop wedges 7f,b respectively
71f,b Snap-in slots for snap in rods 19f,b in slide tubes 70f,b
72f,b Fins for end-stop wedges 73f,b
73f,b Domed forehand and backhand rotational end-stop wedges
74f,b Sleeves for slide tubes 70f,b
75f,b Slots through sleeves 74f,b, structural shell 56, and tube 54, for fins 72f,b
76f,b Orifices Of sleeves 74f,b extending through Shell 56 and tube 54 for installation and removal of slide tubes 70f,b
80 Raised grip-sleeve guard for rotational endstop wedges 73f,b
82 Inwardly curled grid-sleeve glide
84f,b Cutouts in glide 82 to bypass wedges 73f,b during installation and removal of rotatable handle grip
86f,b Helically oriented and canted rotational end-stops for forehand and backhand strokes
88 Semi-rigid elastically deformable grip-sleeve
89 Brake lining of very high coefficient of friction rubber
89a Tube shaped rubber brake lining
90 Outwardly lipped slit in 80 and grip-sleeve 88
92a,b,c Semicircular tactile indicator prongs/rotational glides
94a,b,c Semicircular tactile indicator wedges/rotational glides
102 Standard slot screwdriver head
104 Phillips head
106 Snap-on socket head
160 Snap-on shaft end
111 Rotatable handle grip for a screwdriver
132 Raised glide collar
134 Rubber overgrip
136 Retaining screw
138a Threaded bore in shaft butt 160
138b Hole in butt of sleeve 188
154 Handle shaft shell
156 Alternate screwdriver handle shaft
158 Metal rod
159 Plastic filler
160 Shaft butt
184 Expansion flute in top end of sleeve 188
187 Pointed gear-shaped teeth
188 Canister shaped grip-sleeve
189 Rotational transmission toothed coupling pad
194a,b,c Expandable slit flute glides in side wall of sleeve 188 near butt of sleeve 188
201a,b Handle grips for a hockey stick
202a,b Handle grips for a kayak oar
204 Glove
205 Open nylon mesh
206 Ergonometric rubber pads
207 Square pattern of thicker part of 206
208 A user's hand
211 Rotatable handle grip with stationary end-stops
234 Foam rubber overgrip for handle grip 211
236a Upper scalloped retaining flange for handle grip 211
236b Lower scalloped retaining flange for handle grip 211
238a Scalloped upper end of overgrip 234/tactile indicator
238b Scalloped lower end of overgrip 234/tactile indicator
240 Index finger restraint
242 Middle finger restraint
244 Ring finger restraint
250 Thumb restraint
254 Handle shaft with stationary end-stops
256 Typical racquet shaft assembly with circular shape
266 Tactile indicator slot for ball bearing 294
273a Upper end-stop wedge
273b Lower end-stop wedge
275a Upper end-stop slot inside overgrip 234
275b Lower end-stop slot inside overgrip 234
288 Grip sleeve with slot 266
292 Loaded spring
294 Ball bearing
311 Rotatable handle grip with C-ring sleeve and foam rubber glides
334 Foam rubber overgrip with integral glides at ends
382 Integral foam rubber glide at end of overgrip 334
388 C-ring grip sleeve
389 Rubber brake lining on inner surface of sleeve 388
411 Sleeveless rotatable handle grip with foam rubber dot glides
434 Foam rubber overgrip with integral field of dot glides
482 Field of foam rubber dot glides
489 Rubber brake lining between glides 482
511 Sleeveless rotatable handle grip with anatomically oriented glides
534 Foam rubber overgrip with integral anatomically oriented glides
582 Anatomically oriented foam rubber glides
589 Rubber brake lining on inner surface of overgrip 534
611 Rotatable compressed foam rubber handle grip with tapered bore
632 Octagonal stationary handle grip
636 Butt cap screw
654 Tapered octagonal shaft
689 Field of small circular depressions on 654
711 Rotatable sleeve handle grip
754 Eight sided handle shaft tube
756 Conventional racquet shaft and foam core
789 Series of rubber brake surfaces between vertices of tube 754
811 Curvilinear triangular ribbed rotatable handle grip
834 Foam rubber overgrip with longitudinal slits
856 Standard racquet shaft assembly with curvilinear triangular shape
888 Grip sleeve with longitudinal ribs
889 Brake lining on shaft 856
911 Elliptical corrugated rotatable handle grip
934 Foam rubber overgrip for handle grip 911
956 Standard racquet shaft assembly with elliptical shape
988 Corrugated grip sleeve
989 Series of rubber brake surfaces on inside of sleeve 988

DESCRIPTION—FIGS. 1A THROUGH 1J

FIG. 1A through FIG. 1J show different views of a preferred embodiment of the invention. Features include: a snap-on/off rotatable contoured tennis racquet handle grip with a squeeze actuated brake stopping system, adjustable grip position tactile indicator, and adjustable rotational end-stops for forehand and backhand strokes. FIGS. 1A rough 1J also show those portions of a typical tennis racquet which accommodate this preferred embodiment of the invention and deviate from a conventional tennis racquet.

Figure 1D:
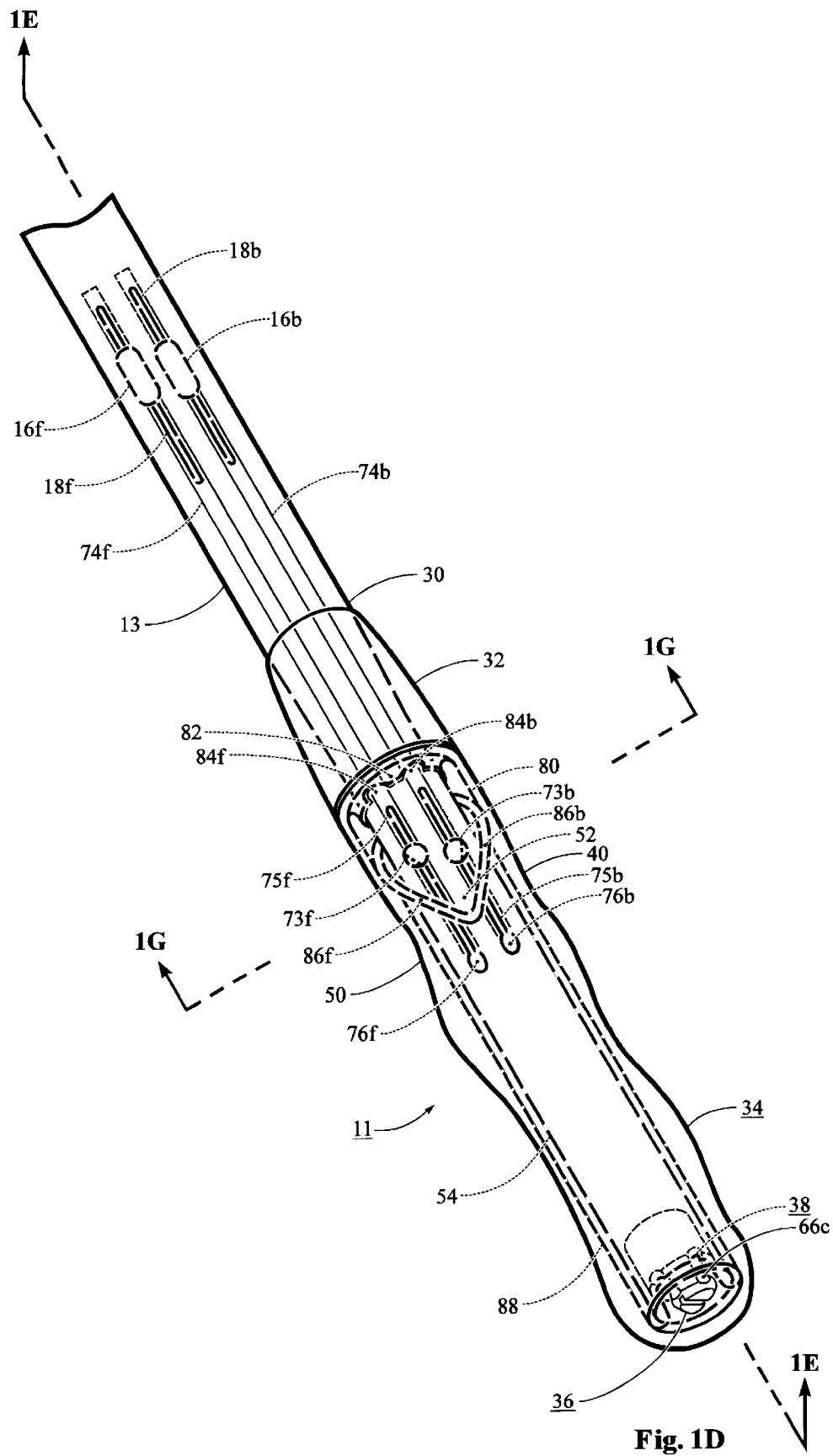
FIG. 1D is a perspective view of the right side of the embodiment shown in FIG. 1A, revealing hidden parts. (Volley position)
Figure 1E:
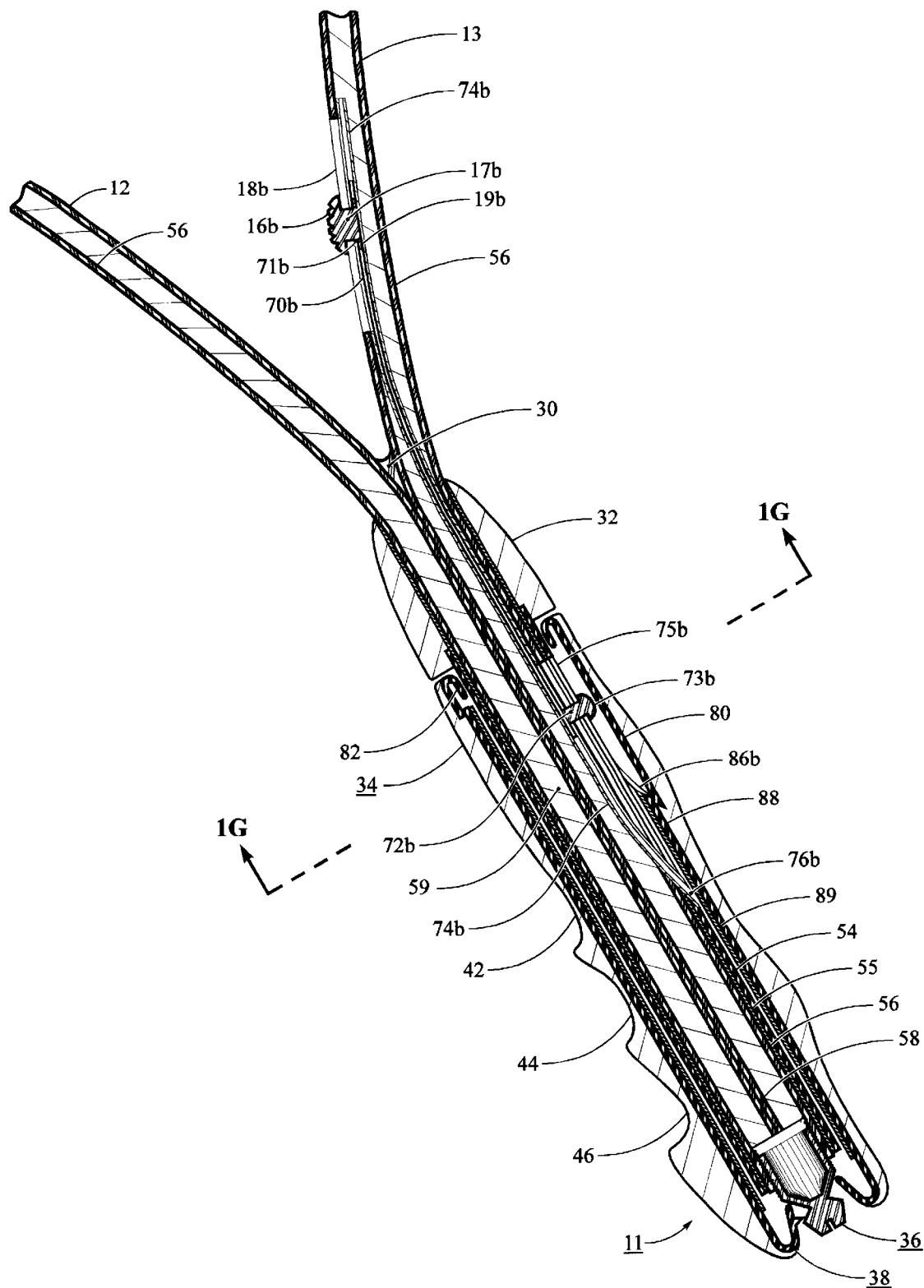
FIG. 1E is a longitudinal sectional view of the embodiment in FIG. 1A taken through rotational end-stop wedge 73b.

As with a typical tennis racquet, there is a bifurcated ("open") throat shown in perspective view in FIG. 1A and FIG. 1B, and in longitudinal sectional view in FIG. 1E. The bifurcated throat comprises two arms 12 and 13. These arms form an inwardly deflected curvilinear V-shape, joined at a throat base 30 which is the top end of the racquet shaft FIG. 1D shows a perspective view of the side of the racquet and handle grip. In FIG. 1D the cross-sectional shape of the top end of the racquet shaft 30 becomes progressively more circular as it approaches a smooth surfaced circular tube 54.

A stationary foam rubber overgrip 32 shown in FIGS. 1A, 1B, 1D and 1E covers the top end of the racquet shaft 30. Overgrip 32 is attached to a structural shell of the is racquet 56 with a layer of shock absorbing bonding agent 55 such as rubber glue (also shown in FIG. 1G, a cross-sectional view). Overgrip 32 begins roughly 2 cm below the point at which arms 12 and 13 join, and gradually flares to a diameter of approximately 3 cm as it extends down the racquet shaft. Overgrip 32 laps over a tube 54 for a distance of less than 0.5 cm. Tube 54, shown in FIGS. 1B, 1D, 1E and 1G is approximately 17 cm long and is between 1.5 cm and 3 cm in diameter. The wall thickness of tube 54 depends on its material composition; the tube should resist denting or breakage if it is impacted when the tennis racquet is dropped. A 0.1 cm wall thickness of an abrasion resistant material such as nylon is preferred Tube 54 is attached to racquet shell 56 with a layer of bonding agent 55. The bottom 2 cm of the inside of tube 54 is threaded for accepting a racquet component of a snap-on/off rotational glide and tactile grip position indicator 36. Component 36 extends from roughly 0.5 cm below the bottom of tube 54 to approximately 2 cm above the bottom of tube 54. Structural shell 56, a structural spine of the racquet shaft 58, and an inner core foam 59, all terminate roughly 0.3 cm above component 36.

Figure 1F:
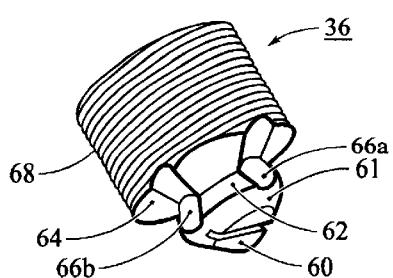
FIG. 1F is a perspective view of component 36, a glide, tactile indicator, and retaining flange.

An isolated perspective view of component 36 is shown in FIG. 1F. At the bottom end of component 36 is a flat, nearly circular curvilinear equilateral triangular slotted face with curvilinear vertices 60. A prong and wedge spreading bevel 61 flares upward and outward at an angle of greater dan 45° from the plane of face 60. Bevel 61 is roughly 0.5 cm long, and has a glassy smooth surface. Except at the top edge, the cross-sectional shape of bevel 61 is roughly the same as face 60. On bevel 61 are three curvilinear vertices located 120° apart. At each vertex is the beginning of one of three volley grip position tactile indicator channels 66a and 66b in FIG. 1F, and 66c in FIG. 1D. These channels are roughly 0.1 cm deep and 0.3 cm wide and continue upward across a wedge retaining bevel 62 and a prong thrust-stop bevel 64. The top edge of bevel 61 is roughly in line with the bottom edge of tube 54. The distance between them averages about 0.2 cm, varying by no more than 0.1 cm. Bevel 62 tapers from the top edge of bevel 61 upward and inward at an angle of less Dan 45° from a plane parallel to face 60. Bevel 62 is approximately 0.3 cm long, has a glassy smooth surface, and has substantially the same cross-sectional shape as the top end of bevel 61. Bevel 64 flares from the top edge of bevel 62 upward and outward at an angle of less than 45° from a plane parallel to face 60. Bevel 64 is roughly 0.5 cm long, has a glassy smooth surface, and has substantially the same cross-sectional shape as bevel 62 Projecting upward from the top of bevel 64 is a threaded tapered tube section 68 which fits tightly with the threaded portion of tube 54. Component 36 is made of a material having properties similar to those of tube 54 and also having a low coefficient of friction.

On the side of arm 13 nearest to arm 12 is a face 14, best shown in FIG. 1A On face 14 are located two striated rotational end-stop adjustment slide-tabs, 16f for forehand strokes, and 16b for backhand strokes. Each tab is approximately 0.3 cm wide, 1 cm long and 0.2 cm thick with rounded edges and comers. Joined to each of tabs 16b and 16f respectively is a tab slot fin 17b shown in FIG. 1E, and a tab slot fin 17f shown in FIG. 1J, an exploded view of adjustable forehand rotational end-stop components. Fins 17f and 17b are approximately 0.1 cm thick and 0.8 cm long and protrude perpendicularly in a longitudinal direction from the back sides of tabs 16f and 16b respectively. Fins 17f and 17b each termite in a snap-in rod 19f and 19b respectively, which are approximately 1 cm long and 0.1 cm in diameter. Fins 17f and 17b are each situated in a slot 18f and 18b respectively which are approximately 5 cm long and 0.1 cm wide. Slots 18f and 18b each run longitudinally down face 14 through structural shell 56 and a sleeve 74f and 74b respectively. Slot 18f is located in the middle of the right half of face 14, and slot 18b is located in the middle of the left half of face 14. Slots 18f and 18b terminate an imaginary line across face 14 at which the distance between arms 12 and 13 is approximately 2 cm. To the right of slot 18f and to the left of slot 18b a set of grip position calibrations 20f and 20b respectively, shown in FIG. 1A Directly below each of slots 18f and 18b is printed a designation: "Forehand" 28f, and "Backhand" 28b, referring to tabs 16f and 16b respectively. On the two sides of arm 13 adjacent to face 14 are grip position symbols for forehand and backhand strokes shown in FIGS. 1A and 1B: "W" 22f and 22b for Western forehand and Western backhand grip positions respectively; "SW" 24f and 24b for Semi-western forehand and Semi-western backhand grip positions respectively; "C" 25f and 25b for Continental forehand and Continental backhand respectively; and "E" 26f and 26b for Eastern forehand and Eastern backhand grip positions respectively.

Figure 1G:
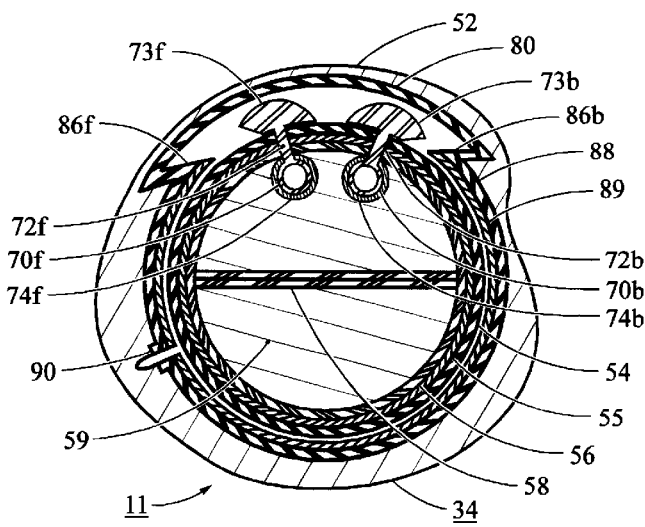
FIG. 1G is a cross-sectional view of the embodiment shown in FIG. 1A at rotational end-stop wedges 73f and 73b.
Figure 1H:
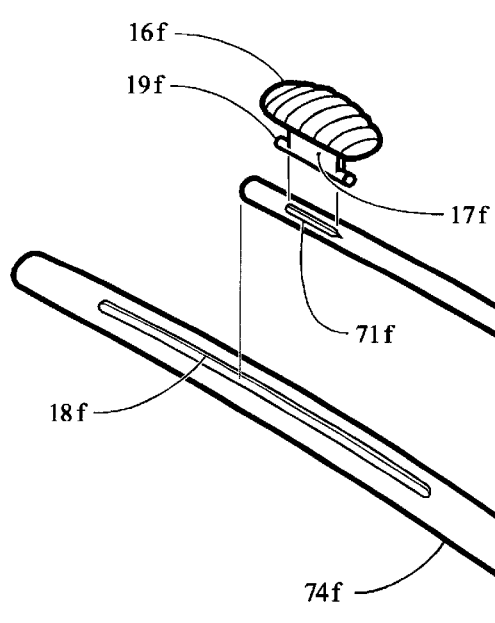
FIG. 1H is an end view of the handle grip of FIG. 1A.
Figure 1H:
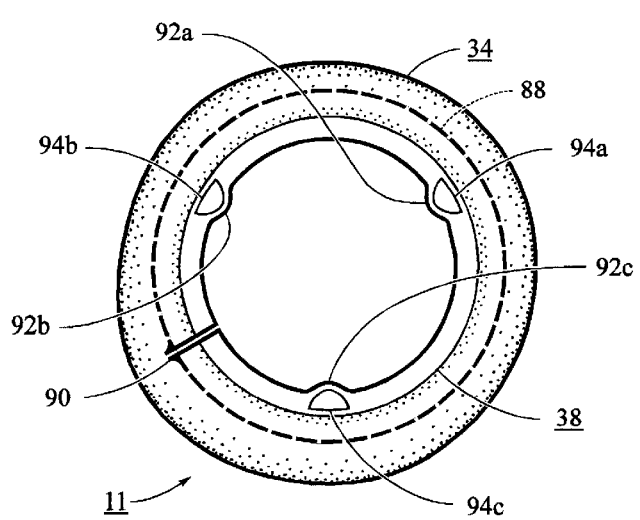
Figure 1J:
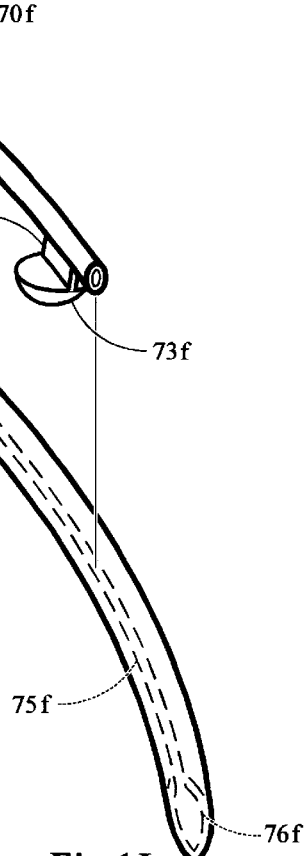
FIG. 1J is an exploded view of adjustable forehand rotational end-stop components.

The previously mentioned snap-in rods 19f and 19b shown in FIG. 1E and FIG. 1J are each situated in a snap-in slot 71f and 71b respectively. Slots 71f and 71b are approximately 0.8 cm long and 0.1 cm in width and each penetrates one side of a flexible slide-tube 70f and 70b respectively, at approximately 0.5 cm from their top ends. Slide-tubes 70f and 70b are approximately 15 cm long with an inside diameter of approximately 0.1 cm and an outside diameter of approximately 0.2 cm and are constructed of a material such as nylon which is flexible, strong, lightweight, abrasion resistant, has a low coefficient of friction, and has good shock absorption and vibration dampening characteristics. Made from a similar material, sleeves 74f and 74b are approximately 22 cm long and fit snugly around slide-tubes 70f and 70b respectively. Sleeves 74f and 74b are situated inside the tennis racquet as shown in FIG. 1E and FIG. 1G. Sleeves 74f and 74b begin approximately 1 cm above slots 18f and 18b respectively and are bonded to the inner surface of the structural shell of the tennis racquet 56 at face 14. The remaining circumference of sleeves 74f and 74b are surrounded by the racquet's inner core, a lightweight foam 59. FIG. 1E and FIG. 1J show curves in sleeves 74f and 74b respectively. Both sleeves run down the internal side of face 14 and curve towards the opposite face of arm 13 as they approach the top end of the racquet shaft, throat base 30. Sleeves 74f and 74b gradually straighten, and are bonded to the inner surface of structural shell 56. The last 2 cm of sleeves 74f and 74b curve outward gently, penetrating through structural shell 56 boding agent 55, and tube 54, at a shallow angle of less than 10°. The ends of sleeves 74f and 74b are flush with tube 54 and terminate at two orifices 76f and 76b respectively, the installation and removal points of slide-tubes 70f and 70b respectively.

In FIGS. 1D, 1E, and 1J are shown two slots 75f and 75b which begin approximately 1 cm below overgrip 32, run longitudinally down tube 54 roughly in line with slots 18f and 18b respectively, and terminate at orifices 76f and 76b respectively. Slots 75f and 75b are approximately 6 cm long and 0.1 cm wide and penetrate through tube 54, bonding agent 55, structural shell 56, and sleeves 74f and 74b respectively. Situated in each of slots 75f and 75b is a fin 72f and 72b respectively. On their inwardly facing edges fins 72f and 72b are molded to slide-tubes 70f and 70b respectively, approximately 0.2 cm from the end of each slide-tube. On their outwardly facing edges fins 72f and 72b are each molded to the middle of the underside of a domed forehand rotational end-stop wedge 73f and a backhand wedge 73b respectively. Fins 72f and 72b are roughly 0.5 cm long, 0.1 cm wide and of a height such that the back sides of wedges 73f and 73b are tight against the outer surface of tube 54. Wedge 73f has a domed shape with a portion of its lower side missing. Wedge 73f is roughly 0.2 cm thick at its center, and approximately 0.5 cm in diameter. The lower left side of wedge 73f has an inwardly beveled surface which creates a 45° space between wedge 73f and the surface of tube 54. The bevel is canted roughly 30° to the longitudinal axis of the racquet shaft, extending upward and outward to the left Backhand end-stop wedge 73b is a mimor image of wedge 73f.

Shown in FIGS. 1A, 1B, 1D, 1E, 1G, and FIG. 1H (an end view), is a rotatable handle grip 11. The top of handle grip 11 is approximately 0.1 cm below overgrip 32. Handle grip 11 is roughly 17 cm long and extends approximately 0.5 cm below tube 54, flush with face 60. Handle grip 11 comprises: a semi-rigid elastically deformable or resilient grip-sleeve 88; a raised grip sleeve guard 80 for rotational end-stop wedges 73f and 73b; an inwardly curled grip-sleeve rotational glide 82; an inwardly curled grip-sleeve component 38 fitting to component 36; two helically oriented and canted rotational end-stops, one for forehand strokes 86f and one for backhand strokes 86b; a brake lining of very high coefficient of friction rubber 89; and a contoured foam rubber overgrip 34.

Overgrip 34 shown in the drawings is for a right-handed player. An overgrip for a left-handed player would simply be a mirror image. Overgrip 34 is roughly cylindrical in shape with a varying wall thickness of 0.5 cm or less. In addition to a bulge for the palm of the right hand 48 in overgrip 34, there are depressions for a index finger 40, middle finger 42, ring finger 44, pinky finger 46, and thumb 50, shown in FIGS. 1A and 1B. Each depression is oriented roughly 60° to the longitudinal axis of overgrip 34 when viewed from the side shown in FIG. 1A. In the same figure, the left sides of depressions 42, 44, and 46 are situated progressively further from tube 54, wrapping around an imaginary line oriented at roughly 5° downward and to the left of the longitudinal as of overgrip 34. FIGS. 1A, 1D and 1G shows a wedge shaped area 52 of about 60° formed between depressions 40 and 50, located at the upper portion of overgrip 34.

Overgrip 34 is formed or bonded with heat, glue, or mechanical means to raised guard 80 and sleeve 88 shown in FIGS. 1A, 1B, 1D, 1E, 1G, and 1H. Both raised guard 80 and sleeve 88 are constructed of material of no more than 0.1 cm thick which elastically deforms over a Large area rather than in a very localized area at which pressure is applied. In addition, the material should withstand repeated deformations without cracking. A semi-rigid plastic is preferred. Raised guard 80 is roughly 8 cm at its longest point and is located behind wedge shaped area 52 The bottom edge of raised guard 80 extends roughly 0.2 cm over the top edge of sleeve 88, and the two are joined by a continuous canted strip roughly 0.2 cm wide which forms two end-stops 86f and 86b. End-stops 86f and 86b are helically oriented upward at roughly 30° to the left and right respectively from an imaginary line which runs longitudinally down rotatable handle grip 11 through the junction of depressions 40 and 50. The junction of end-stops 86f and 86b has a radius of approximately 0.3 cm and occurs at the longest part of raised guard 80. Located 180° from the junction of end-stops 86f and 86b is an outwardly lipped slit 90 which runs longitudinally down raised guard 80, sleeve 88, brake lining 89, rotational glide 82, and component 38. When rotatable handle grip 11 is installed on the racquet shaft, slit 90 is stretched open approximately 0.2 cm. The edges of slit 90 are lipped outward only enough to make them roughly as stiff as the rest of sleeve 88.

The top edge of raised guard 80 curls inward approximately 0.3 cm to form rotational glide 82 Rotational glide 82 is approximately 0.2 cm long and has a slightly smaller diameter than tube 54 before the glide is installed on tube 54. There are two cutouts 84f and 84b in rotational glide 82. Cutouts 84f and 84b correspond in shape and distance apart to wedges 73f and 73b respectively, except the cutouts are larger. The inside surface of rotational glide 82 is glossy smooth.

Bonded to the inside of sleeve 88 is brake lining 89 shown in FIGS. 1B, 1E and 1G. Brake lining 89 comprises a layer of rubber roughly 0.1 cm thick possessing a very high coefficient of friction. When rotatable handle gap 11 is installed on the racquet shaft, there is less than 0.1 cm between brake lining 89 and tube 54.

Shown in FIGS. 1B, 1E and FIG. 1H is component 38. Component 38 begins at the bottom edge of sleeve 88 and curls inward around the bottom of tube 54, then funnels upward and inward roughly 1.3 cm at an angle of approximately 10° from the wall of tube 54. Extending at the same angle roughly 0.2 cm to the top edge of component 38 are three semicircular tactile indicator prongs 92a, 92b, and 92c, located 120° apart. Located roughly 0.8 cm directly below each prong are semicircular tactile indicator wedges 94a, 94b, and 94c which project inwardly approximately 0.2 cm. Each wedge has a plano-convex cross-sectional shape with the convex side facing downward. Each wedge measures roughly 0.02 cm in thickness at the midpoint of its base. Glide 82, raised guard 80, rotational end-stops 86f and 86b, grip-sleeve 88, and component 38 ideally are molded as one piece. It is possible, however, for each to be formed independently and then joined.

OPERATION OF FIRST EMBODIMENT

The embodiment of the invention shown in FIGS. 1A through 1J performs better and is easier to use than other racquets with rotatable handle grips because it employs one or more of the following operating systems:

1. A stepless grip position modifying system.
2. An ergonometrically contoured grip shape.
3. An adjustable rotational grip position tactile indicator system.
4. A steplessly adjustable rotational end-stop system.

5. A snap-on/off rotatable handle grip system.

System 1

A stepless grip position modifying system allows the tennis racquet shown in FIGS. 1A through 1J to be used in almost precisely the same way as a conventional racquet with a stationary grip. To change rotational grip positions, for example forehand to backhand and hit a tennis ball, a player.

(a) grasps the racquet with two hands, one at the throat and one on the handle grip;

(b) rotates the racquet about its longitudinal axis relative to his gripping hand, stopping at the desired position; and, (c) swings the racquet, squeezing the handle grip very firmly just before the racquet contacts the ball, an almost instinctual action, which prevents any rotational movement between the handle grip and the racquet; the squeezing action causes part of the handle grip to temporarily deform radially towards the handle shaft, thereby engaging brake lining 89 against tube 54 until the hand pressure is relaxed.

A player performs such rotational grip position changes without moving his hand relative to rotatable handle grip 11, a distinct advantage over using a stationary handle grip. Different grips are manufactured so that the pressure required to activate them will accommodate varying hand strengths, from child to adult.

System 2

An ergonometrically contoured grip shape such as overgrip 34 shown from different sides in FIGS. 1A and 1B, reduces the amount of gripping pressure needed to use the handle grip. As a result:

(a) it is easier to change rotational grip positions without accidentally engaging the squeeze actuated stopping system;

(b) hand fatigue is reduced; and, (c) torque can be better transmitted through the handle grip. The contours and depressions of overgrip 34 also help to prevent hand slippage on the handle grip by:

(d) incaeasing the surface area of handle grip 11 that is in contact with a player's hand, as compared to that of handle grips that are not contoured to fit a player's hand; and, (e) providing physical barriers to hand movement by partially surrounding each finger.

The contours also position a user's hand in the same position every time the racquet is used, thereby improving a user's consistency of play, as well as eliminating the need for instruction on how to best grasp the handle grip.

System 3

An adjustable rotational grip position tactile indicator system enables a player to accurately rotate the racquet to any desired rotational grip position. System 3 comprises components 36 and 38 which are interlocked, shown in FIGS. 1A, 1B, 1D, 1E, 1F, and 1H. Prongs 92*a*, 92*b* and 92*c*, and wedges 94*a*, 94*b* and 94*c* are parts of component 38. They glide upon and are suspended between bevels 64 and 62 which are parts of component 36. When components 36 and 38 are rotated relative to each other, component 38 stretches open or closed at slit 90 in order to conform to the varying diameter of component 36. The wider component 38 is stretched, the greater the resistance to relative rotation between the racquet and the handle grip . Components 36 and 38 are situated such that a player experiences the least resistance to said rotation at roughly Semi-western forehand and Semi-western backhand positions, which are approximately 120° apart The greatest resistance to rotation occurs just before the volley position, approximately halfway between forehand and backhand. At the volley position, prongs 92*a,b,c* and wedges 94*a,b,c* simultaneously click into channels 66*a*, 66*b*, and 66*c* respectively. The prongs and wedges easily rotate out of the channels when changing rotational grip positions. The volley position, and consequently the entire tactile system, can be adjusted by screwing component 36 further into or out of tube 54. Since there are very close tolerances between the parts, and since component 36 is slightly tapered, a very tight friction fit is achieved, which prevents accidental slippage during use.

System 4

A steplessly adjustable end-stop system shown in FIGS. 1A, 1B, 1D, 1E, 1G, and 1J, prevents the racquet from rotating relative to handle grip 11 past extreme forehand and backhand rotational grip positions a player has preset A player sets the extreme forehand and backhand rotational end-stop positions by adjusting tabs 16*f* and 16*b* respectively. Tabs 16*f* and 16*b* slide up and down along slots 18*f* and 18*b* respectively. A player aligns the tabs with grip position calibrations 20*f* and 20*b* and their corresponding symbols. Tabs 16*f* and 16*b* control end-stop wedges 73*f* and 73*b* via flexible slide tubes 70*f* and 70*b* respectively. Wedges 73*f* and 73*b* slide up and down along slots 75*f* and 75*b* respectively. The racquet cannot rotate past the extreme forehand and backhand rotational grip positions a player has preset because rotational end-stops 86*f* and 86*b* strike against end-stop wedges 73*f* and 73*b* respectively. Their interlocking canted surfaces prevent sleeve 88 from riding up and over the end-stop wedges. When rotational end-stops 86*f* and 86*b* strike end-stop wedges 73*f* and 73*b*, the wedges do not move up slots 75*f* and 75*b* for a few reasons: rotational end-stops 86*f* and 86*b* are helically oriented at a shallow angle of only 30° to slots 75*f* and 75*b* ; slide tubes 70*f* and 70*b* fit snugly in sleeves 74*f* and 74*b* respectively; and brake lining 89 extends over the inner top edge of sleeve 89, allowing contact with wedges 73*f* and 73*b*.

Extreme forehand and backhand rotational grip positions are often the positions employed for most ground strokes. Tactually sensing those positions is unnecessary; a player simply rotates the racquet about its longitudinal axis relative to handle grip 11 as far as it goes clockwise or counterclockwise to either the forehand or backhand position.

System 5

A snap-on/off rotatable handle grip system enables a player to quickly and easily replace handle grip 11, shown removed from the racquet in FIGS. 1B and 1H, and shown installed on the racquet in FIGS. 1A, 1D, 1E and 1G. In addition, this system provides an engagement means for retaining handle grip 11 with firm contact on the handle shaft during use.

Rotatable handle grip 11 is installed on the racquet shaft by sliding rotational glide 82 over tube 54. Slit 90 spreads open to allow the diameter of rotational glide 82 to expand to fit over tube 54, thereby creating a snug fit. Cutouts 84*f* and 84*b* must be lined up with end-stop wedges 73*f* and 73*b* to allow rotational glide 82 to bypass the end-stop wedges. As the user continues to slide rotatable handle grip 11 up tube 54, wedges 94*a*, 94*b* and 94*c* are spread apart by bevel 61. Slit 90 widens, thereby increasing the diameter of component 38 which allows the wedges to clear the top of bevel 61. Once wedges 94*a*, 94*b* and 94*c* have reached bevel 62, slit 90 narrows and component 38 sings back to almost its original size.

To remove handle grip 11 the player holds the racquet stationary while pulling down hard on the handle grip. This is done with the user's grip loose about handle grip 11 so as to allow the diameter of component 38 and the lower portion of sleeve 88 to expand. It is easy for the user to perform this operation because depressions 40, 42, 44, 46 and 50 in overgrip 34 have portions of their surfaces almost perpendicular to tube 54. Cutouts 84f and 84b must once again be lined up with end-stop wedges 73f and 73b to allow rotational glide 82 to bypass the end-stop wedges.

When combined, the above described operation systems provide users with more control over their shots during play than when using existing rotatable handle grips, especially when hitting a ball hard.

DESCRIPTION—FIG. 1K

Another embodiment of the invention, shown in FIG. 1K in a partially exploded view, and in cross-sectional view in FIG. 1M, is representative of the wide range of possible applications. Both figures show a screwdriver with a rotatable handle grip 111. Many possible head configurations are possible but only three are shown: a slotted head 102; a Phillips head 104; and a snap-on socket head 106, with a snap-on shaft end 108. A metal rod 158 is fixed in a plastic filler 159 held in a handle shaft shell 154. Shell 154 is circular in cross-section, and is approximately 16cm long. Most of shell 154 is approximately 1.5 cm in diameter. The top 1 cm of shell 154 however, widens to roughly 1.8 cm in diameter to become a raised glide collar 132.

In the upper half of shell 154 are located a plurality of pointed gear-shaped teeth 187. Each tooth is shaped like a pointed gothic arch with a flared base. The spaces between teeth have a similar shape, but upside-down. Each tooth is approximately 2 cm in length and its ridge is oriented in a longitudinal direction down the shaft. Teeth 187 run 360° around shell 154. The bottom of shell 154 comprises a flat-surfaced shaft butt 160, and a threaded bore 138a Bore 138a is approximately 0.3 cm in diameter.

Handle grip 111 comprises a rubber overgrip 134, and a semi-rigid elastically deformable canister-shaped grip sleeve 188. Overgrip 134 is approximately 16.5 cm long, roughly cylindrical in shape, and has a varying wall thickness of approximately 0.5 cm or less. Overgrip 134 is formed or bonded to sleeve 188, extends roughly 0.5 cm below the end of sleeve 188, and partially covers the canister end of the sleeve. Sleeve 188 is constructed of material roughly 0.1 cm thick which elastically deforms with hand-squeezing pressure over a large area, rather than in a very localized area at which pressure is applied, and which will withstand repeated deformations without cracking On the upper half of sleeve 188, molded on the inside of the canister, is a rotation transmission toothed coupling pad 189. Pad 189 possesses a plurality of pointed gear-shaped teeth. Each tooth's ridge runs 1.5 cm longitudinally down the tube. Pad 189 extends roughly 45° around the inside diameter of sleeve 188. When sleeve 188 is installed over shell 154, the teeth of pad 189 are directly opposing teeth 187, with roughly 0.05 cm of clearance between them.

A semi-circular expansion flute 184, in the top end of sleeve 188, runs approximately 1 cm longitudinally down the sleeve, and is roughly 0.1 cm in diameter, extending away from shell 154.

Located at the bottom end of sleeve 188 are three slit expansion flutes 194a, 194b, and 194c, which are evenly spaced at 120° intervals around the circumference of sleeve 188. Flutes 194a,b,c are the same size as flute 184, but extend towards shell 154. Flutes 194a,b,c are slit down their length and perpendicularly across their ends.

In the center of the canister end of sleeve 188 is a hole 138b which is approximately 0.3 cm in diameter. Situated in hole 138b and threaded bore 138a is a retaining screw 136.

A simpler version of the screwdriver of FIG. 1K can be seen in cross-sectional view in FIG. 1N: shell 154 and filler 159 from FIG. 1M can be molded as one piece, an alternate screwdriver handle shaft 156. Additionally, grip sleeve 188 can function as a gripping surface, thereby eliminating overgrip 134. Likewise, retaining screw 136 can be eliminated when sleeve 188 is configured to snap on and off. It should be further noted that the screwdriver can be made to function with a frictional torque transmission such as has been described for the racquet embodiments of FIGS. 1A and 1C.

OPERATION OF EMBODIMENT DESCRIBED IN FIG. 1K

The embodiment of the invention shown in FIG. 1K performs better and is easier to use than other screwdrivers because it employs a rotatable handle grip with a squeeze actuated torque transmission system. This system allows the screwdriver to be used in almost precisely the same way as a conventional screwdriver with a stationary handle grip. To drive-in or remove a screw, the user first firmly squeezes the screwdriver handle grip and presses the screwdriver towards the screw, an instinctive nearly automatic action. The user then simply twists his hand in the desired direction, and then relaxes his grip before rotating his hand back to the original starting position. Since the user can rotate the implement without moving his hand relative to rubber grip 134, he need not fully loosen his grip as with a stationary handle screwdriver. This allows the user to handle the screwdriver with greater comfort and control by eliminating the opposing functions of conventional stationary handle grips; i.e. such handle grips are required to provide maximum friction against the user's hand when the screwdriver is being rotated, while at other times to provide minimum friction so that the user's hand can be rotated about the handle grip while maintaining some griping pressure to control the screwdriver. This embodiment of the invention operates by providing maximum friction between the handle grip and the user's hand at all times. The need to slide the hand around the handle grip has ben replaced by the ability to rotate sleeve 188 about shell 154. Expansion flutes 184 and 194a, b,c provide a snug fit between sleeve 188 and shell 154. When sleeve 188 is squeezed, the teeth of pad 189 act like a brake by engaging teeth 187. Since the opposing sets of teeth are pointed, they do not need to be aligned with each other; they are self seating.

Unlike a ratcheting screwdriver, the screwdriver shown in FIG. 1K operates without the need to press any switches or buttons. Rather, it can be instantly operated in either direction for driving-in a screw or removing a screw. In addition, although the torque transmission system is made of inexpensive plastic in this embodiment, instead of steel as in ratcheting screwdrivers, breakdown or deterioration of performance is less likely to occur for the following reasons: an absence of friction between opposing teeth when rotated past each other; fewer individual components; fewer moving parts; and redundancy—manifested in a multiplicity of interlocking teeth, thereby reducing the stresses per tooth.

VARIATIONS

Although two preferred embodiments of the invention have been specifically describer Dew are many possible embodiments of the invention. It is also possible to employ an infinite number of configurations and materials in those embodiments. Here are some examples.

In addition to a tennis racquet and a screwdriver, the implement of the invention can be any other type of sports racquet, a tube wrench, allen wrench, or any other type of rotary hand tool, a cricket bat, a rowing oar or paddle, a hockey stick, a golf club, or any other similar hand held implement. A hockey stick with rotatable handle grip is shown in 2A. The hockey stick has two handle grip areas 201*a* and 201*b*, one of which is a squeezably stoppable rotatable handle grip. A kayak oar shown in FIG. 2B, also has two handle grips 202*a* and 202*b*, of which one is rotatable and squeezably stoppable. The performance of both the oar and the hockey stick are enhanced by having a rotatable grip which allows the implements' striking surfaces to be reoriented without a user having to slide his hand on the handle or let go of the grip.

If standard implements are used rather than ones with rotatable handle grips, their performance can still be enhanced using special gloves which employ the same operating principals as the previously described embodiments. Such gloves enhance the ease in which an implement can be rotated in a user's hand while amplifying the holding force of the user's grasp when the handle is squeezed firmly. One embodiment of such a glove is shown in a perspective view in FIG. 2C, and in an enlarged sectional view of a typical cell in FIG. 2D. A glove 204, is formed of an open nylon mesh 205. Mesh 205 forms a pattern of square openings or cells roughly 2 mm in either dimension. Bonded to the inner surface of mesh 205 are a series of ergonometric rubber pads 206 possessing a high coefficient of friction Pads 206 have free-form sinuous shapes, and vary in size. The exact shapes, sizes, and locations of the pads are determined by the flexibility and elasticity of the materials of glove 24, as well as the surface areas of the glove that are in contact with the handle of a particular implement during use. Located on pads 206 is a pattern of squares where the rubber is thicker 207, extending both towards a user's hand 208 and towards the outer surface of mesh 205, just shy of being flush. Squares 207 are slightly smaller than the cell openings in mesh 205. With such an arrangement, the majority of the rubber does not contact the handle shaft when the glove membrane is undeformed, thereby allowing easy rotation of the glove when the user's grip is relaxed; a substantial portion of the rubber contacts the handle of an implement only when the user squeezes firmly, thereby amplifying the user's grip. This phenomenon is not possible when using an all rubber glove or a glove with protruding rubber nubs. Depending on the surface finish and choice of materials, the glove can be made to glide more easily about the handle of an implement than a bare hand; in such a case the handle may need a glove retaining means such as a flared butt.

Other variations of the invention can be seen when the embodiment of FIG. 1A is simplified. Grip sleeve 88 can be eliminated, as seen in alternate racquet designs shown in partially exploded views in FIGS. 2E and 6A Such handle grips are inherently flexible, so means for:
 a) restricting range of rotation (end-stops);
 b) mounting or installation of the handle grip;
 c) tactile indication (shape and/or variable resistance to rotation);
 d) rotation without actuation of brake (glides); and
 e) braking or rotational transmission; are configured differently. The following are examples of a) through e) and related variations.

a) Restricting Range of Rotation (End-stops)

Figure 2A:
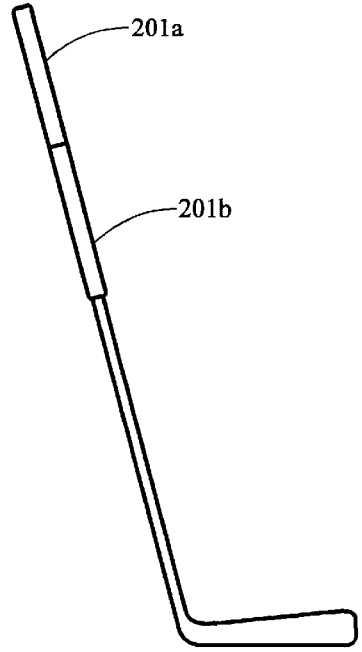
FIG. 2A is a perspective view of a hockey stick with a rotatable handle grip.
Figure 2B:
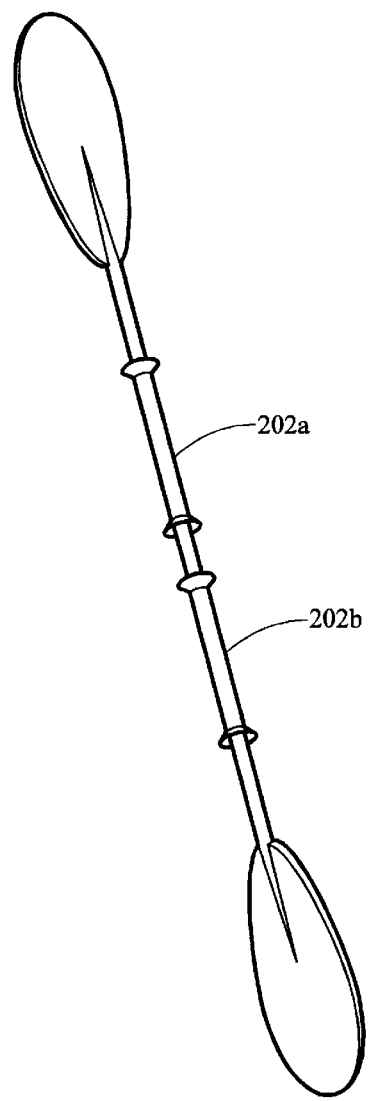
FIG. 2B is a perspective view of a kayak oar with a rotatable handle grip.
Figure 2C:
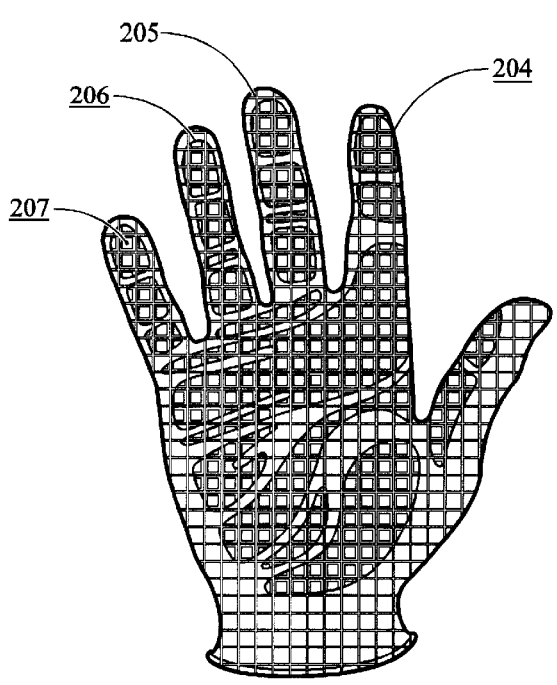
FIG. 2C is a perspective view of an open mesh glove with squeeze actuated high friction rubber pads.
Figure 2D:
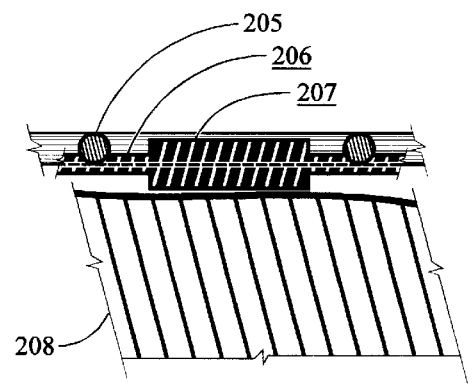
FIG. 2D is an enlarged cross-sectional view of a typical cell of the glove in FIG. 2C.

The adjustable end-stop mechanism seen in FIG. 1A can be replaced by numerous systems. One such system is shown in FIG. 2E The end-stop system is simplified by molding nonadjustable end-stops into each handle grip and implement Such an arrangement need not limit a player's choice of settings; easily replaceable tennis racquet handle grips of different configurations allow different combinations of extreme forehand or backhand positions. For example, the end-stop on one handle grip will limit the range of rotation from eastern forehand to eastern backhand, while a different handle grip has end-stops that stop rotation at semi-western forehand and backhand positions. Shown in FIG. 2E are a handle shaft 254, and a rotatable handle grip 211 with two stationary end-stops 273*a* and 273*b* at opposite ends of shaft 254; each end-stop is roughly 2 cm long and 0.5 cm wide and is parallel to, but offset from the other roughly 120°. Inside handle grip 211 is an upper end-stop slot 275*a*, and a lower end-stop slot Big*b* Slots 275*a* and 275*b* each house an end-stop wedge 273*a* and 273*b* correspondingly. Shown in FIG. 2E, and more clearly in FIG. 2J a cross-sectional view of the racquet of FIG. 2E, are the sides of end-stop wedges 273*a* and 273*b*, which are canted to form a dovetail undercut; slots 275*a* and 275*b* have corresponding canted sides, which prevent over-riding during rotation.

There is also the option of eliminating end-stops on tennis racquets entirely, an option which is practicable as long as the embodiment allows a player to determine angular displacement through tactile means.

b) Mounting or Installation of the Handle Grip

Handle grip 211, shown in FIG. 2E, is installed on shaft 254 by pushing and temporarily deforming or stretching the handle grip over a retaining flange 236*b*. An opposing flange 236*a* at the top of the shaft prevents significant axial movement of the handle grip.

Figure 6A:
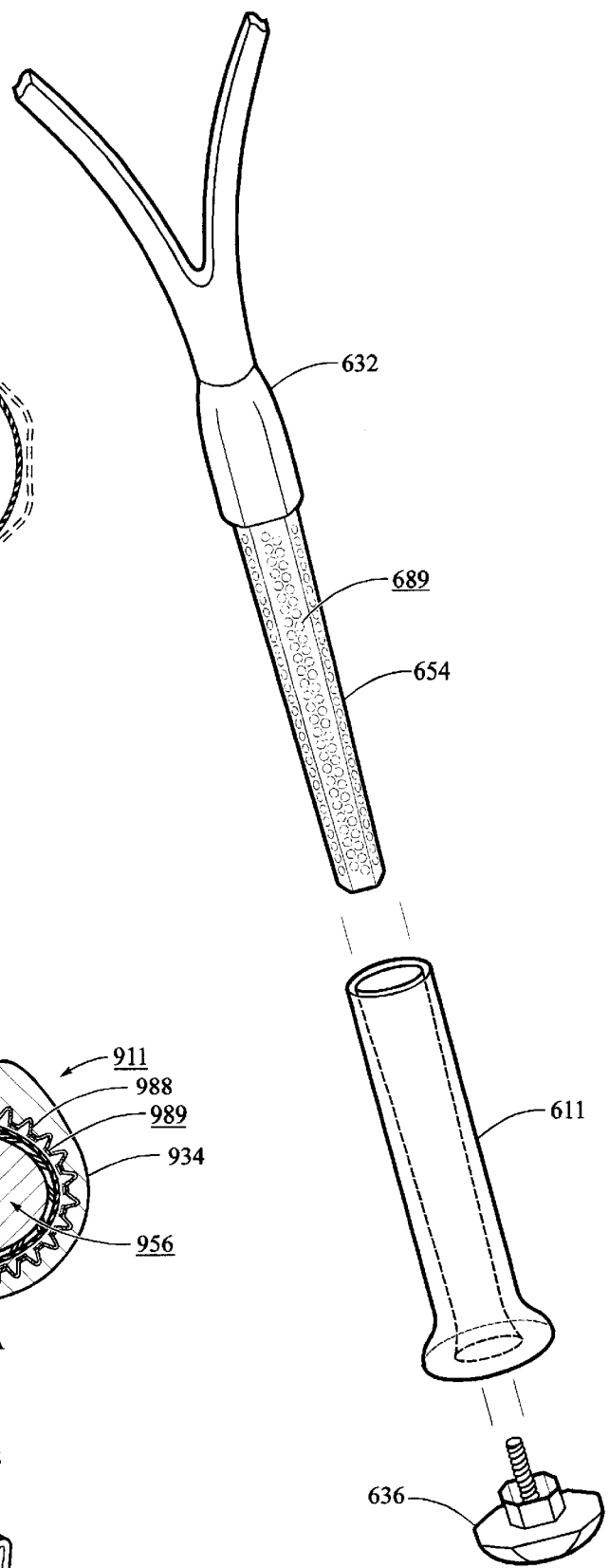
FIG. 6A is an exploded view of a rotatable handle system for a tennis racquet with tapered octagonal shaft.

For handle grips with a semi-rigid sleeve, a snap-on/off feature as seen in the main embodiment, can be replaced by many systems too numerous to describe here, any of which are easily incorporated by persons skilled in the art. Alternately, the snap-on/off feature may be eliminated entirely, as seen in FIG. 6A, an exploded view of a rotatable handle system for a tennis racquet with a tapered octagonal shaft. A locking screw or similar fastener, such as a butt cap screw 636 can be used. Butt cap screw 636 telescopes over the end of a tapered octagonal shaft 654, functioning like a rotatably interlocked screw and washer assembly. Alternately, a rotatable handle grip can be permanently mounted on the implement.

c) Tactile Indication (Shape and/or Variable Resistance to Rotation)

Tactile position indicators are more than a convenience for a user to determine the angular displacement of the head of an implement. For implements, particularly sports equipment that utilize rotatable handle grips with an infinite number of rotational positions, the lack of a tactile position indicator would often render the item unusable. Many types of tactile indicators are possible, and different implements have different requirements. The embodiment shown in FIG. 1A utilizes a tactile indicator which provides variation in friction and pressure opposing parts exert on each other in a radial direction during rotation. The embodiment shown in FIG. 2E employs an alternate tactile position indicator system which biases the opposing parts in an axial direction during rotation. The thrust surfaces of two retaining flanges 236*a* and 236*b* have scalloped or undulating shapes. Flanges 236*a* and 236*b* each engage a similarly shaped handle grip end 238a and 238b respectively. Ends 238a and 238b are part of a foam rubber over grip 234. The opposing parts nestle in each other without significant deformation when the handle grip is situated in either an extreme forehand or backhand rotational grip position, and act as axial shock absorbers.

Many other tactile indicator systems are possible. One such configuration which can be employed when a handle grip has a sleeve, is shown in FIG. 2G, a cross-sectional view of a male component of an alternate tactile indicator, and in FIG. 2H, a cut away perspective of a female component of the item in FIG. 2G. In FIG. 2G, a ball bearing 294, and a loaded spring 292, are partially contained within the circular shaped structural shell of an otherwise typical racquet shaft assembly 256. The ball bearing partially projects through an orifice in assembly 256. The ball bearing is engaged by a slot 266 of varying width in a grip sleeve 288.

Another tactile indicator system replaces the circular cross-sectional shape of the shaft of the handle with another form such as an ellipse, oval, curvilinear triangle, or even the octagonal shape of a conventional stationary handle grip as seen in FIGS. 6A through 9A. The new cross-sectional shape is transferred to the handle grip so that a player can feel the changing orientation of the shape as the racquet or handle grip is rotated. The effect is very similar to what a player currently experiences when rotating a conventional stationary handle grip in his hand, and provides the same tactile means for determining racquet face orientation. Consequently, the handle grip will experience a constantly changing radius as it is rotated, and must be configured to allow this. Some handle grips employ a grip sleeve which must be constructed of a thinner or more flexible material than grip sleeves for circular shafts. On the other hand, the grip sleeve must still provide the same resistance to squeezing pressure so that the brake or torque transmission system is not inadvertently activated while the handle grip is being rotated. One of the following systems, or a variation or combination of them, satisfies the requirements mentioned above.

FIG. 6A shows tapered octagonal shaft 654 with smooth rounded edges. Shaft 654 is covered with a field of small circular depressions 689 on each side, and a threaded hole at its butt. A tubular compressed foam rubber rotatable handle grip 611 with a tapered bore and flared butt fits snugly over shaft 654. The degree of snugness is determined by how far butt cap screw 636 is screwed in. Once handle grip 611 is installed it assumes the octagonal shape of a conventional racquet handle. Above handle grip 611 a separate octagonal stationary grip 632 acts as a continuation of handle grip 611 for players that use a two-handed grip. Likewise, butt cap screw 636 also has a matching eight-sided shape. The foam rubber of handle grip 611 glides over shaft 654 during rotation, but when it is squeezed, the foam rubber is pushed into depressions 689, increasing friction and providing a physical barrier to rotational movement.

Figure 7A:
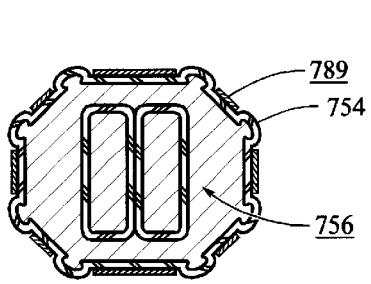
FIG. 7A is a cross-sectional view of a conventional shaped handle shaft for a rotatable handle grip.
Figure 7B:
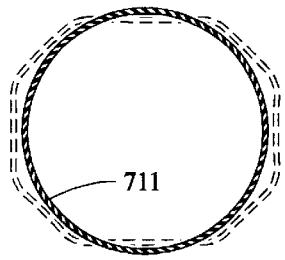
FIG. 7B is a cross-sectional view of an overgrip sleeve for the item in FIG. 7A.

FIG. 7B shows in cross-sectional view a rotatable sleeve handle grip 711 with no overgrip. Sleeve 711 is more flexible than sleeve 88 of FIG. 1B. Sleeve 711 easily conforms to and slides around an eight-sided almost conventional shaped handle shaft tube 754 shown in FIG. 7 Sleeve 711 is either elastically stretchable or has a fixed circumference, and is retained on the handle by flared ends or other retaining means such as an interlocking groove and fin system. The inner surface of sleeve 711 is smooth and slippery. The outer surface has a high coefficient of friction, provided through a rough textured surface, a sticky coating, or a combination thereof. When installed, sleeve 711 fits snugly around tube 754. Tube 754 has smooth bulbous vertices, and is molded over a conventional racquet shaft and foam core 756. Between each vertex of tube 754 is a coating or strip of rubber brake lining 789 which is actuated when the user firmly squeezes sleeve 711 against lining 789. Since the shape of the handle can be felt through sleeve 711, no further tactile indicator is necessary. An end-stop system is also optional.

Figure 8A:
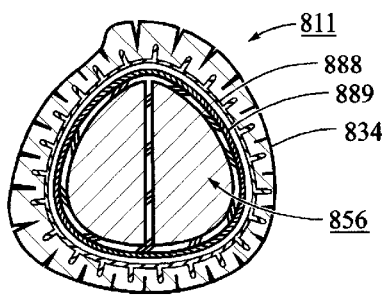
FIG. 8A is a cross-sectional view of a ribbed curvilinear triangular rotatable handle grip system.

FIG. 8A shows in cross-sectional view, a curvilinear triangular rotatable handle grip 811, with a grip sleeve 888 with longitudinal ribs. A rubber brake lining 889 is mounted directly on a racquet shaft assembly 856 of standard construction except for its shape. Ribbed sleeve 888 is made of thinner material than sleeve 88 of FIG. 1B, allowing flexible rotation around the noncircular shaft 856. Sleeve 888 is supported by end mounted glides, such as those in FIG. 1C, described below in d). The glides, in combination with the longitudinal stiffening effect of the many ribs or fins, prevent accidental actuation of brake 889. A foam rubber overgrip 834, with regularly spaced longitudinal slits, covers the fins of sleeve 888. Before installation, sleeve 888 is circular in cross-section, or molded with curvilinear vertices to accentuate tactile feedback; that would facilitate finding forehand, backhand, and volley positions.

Figure 9A:
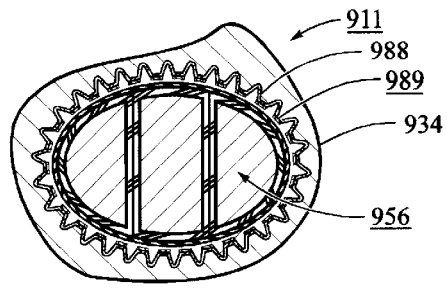
FIG. 9A is a cross-sectional view of an elliptical corrugated rotatable handle grip system.
Figure 9B:
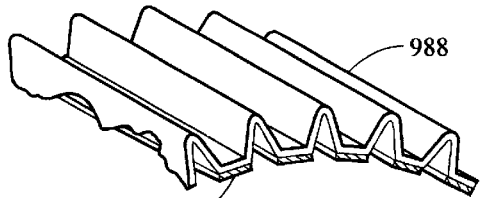
FIG. 9B is a cut-away perspective of the corrugated sleeve shown in FIG. 9A.

FIG. 9A shows in cross-sectional view, an elliptical tubular thin walled corrugated rotatable handle grip 911. This embodiment is very similar to that of FIG. 8A. The main differences include: an elliptical shape of a standard racquet shaft assembly 956; a corrugated grip sleeve 988; and a series of rubber brake surfaces 989 affixed to the inside surface of sleeve 988. The corrugations or folds in sleeve 988, seen clearly in cut-away perspective FIG. 9B, allow the sleeve to be stretched over assembly 956. A foam rubber overgrip 934 stretches with sleeve 988. This allows the overall diameter of the rotatable handle grip to be reduced when squeezed, thereby increasing the contact area of braking surfaces 989.

d) Rotation without Aquatic of Brake (Glides)

The configuration of components which allow rotating and stopping of handle grips can be changed or reversed Such a reversal is seen in FIG. 1C a perspective view of an alternative configuration of tube 54. A tube with raised glide collars at each end 54a, allows for interface with a simpler shape of grip sleeve. Additionally, manufacture and installation of a rubber brake lining is simplified by stretching a tube of high friction rubber 89a over tube 54a Plastic rotational glides such as glide 82 in FIG. 1B, or glide collar 132 in FIG. 1K can be augmented with, or replaced by, foam rubber glides. Foam rubber glides are sufficiently deformable and resilient to allow easy installation and removal of a handle grip. They also minimize vibration around the shaft of an implement. Such configurations are shown in FIGS. 2E, 2J, and 6A described above, and in cut-away perspective views FIGS. 3A, 4A and 5A. FIGS. 2E, 2J, 4A, 5A and 6A show sleeveless rotary handle grips.

FIG. 4A shows a cut away perspective of a handle grip 411 with a field of depressible foam rubber dot glides 482 Dot glides 482 are actually the inner surface of a foam rubber overgrip 434, otherwise very similar to overgrip 34 of FIG. 1B. Located between the dot glides is a thin layer of high friction rubber, brake lining 489. Dot glides 48, in the shape of truncated cones, protrude inward slightly beyond brake lining 489 through holes in lining 489. When overgrip 434 is squeezed dot ides 482 arm compressed, thereby allowing brake lining 489 to be engaged 5A shows a sleeveless rotatable handle grip 511 with anatomically oriented foam rubber glides 582 instead of a field of dots as in FIG. 4A, described above. The foam rubber glides protrude inward at areas not directly beneath the user's hand such as areas between the fingers. Glides 582 are actually the inner surface of a foam rubber overgrip 534. A high friction rubber brake lining 589 covers the rest of the interior surface of overgrip 534.

FIG. 3A shows a cut-away perspective view of a handle grip 311 with an end mounted foam rubber rotational glide 382, a configuration appropriate for a handle grip with a semi-rigid C-ring grip sleeve 388. A foam rubber overgrip 334 covers sleeve 388. A rubber brake lining 389 is bonded to the inner surface of sleeve 388. Glide 382 is elastically deformable, and is part of overgrip 334, extending inward past the top of sleeve 388 and lining 389, Other variations include replacing rotational glides with ball bearing races, or augmenting glides with felt liners to provide bearing surfaces on the handle shaft and the hand interface that are snug and inhibit and dissipate vibration.

The ease with which a handle grip is rotated about a handle shaft has a profound effect on the usability of an implement. Both the type of implement and user preference are important considerations. The ease of rotation can be customized and is determined by a number of factors including: the snugness of fit between the handle grip and the shaft in both radial and axial directions: types of materials employed; surface finishes; surface contact area; configuration of bearing surfaces; and tactile indicator system. A handle grip can be constructed to spin freely about a handle shaft until squeezed, or it can be constructed to remain at a particular position, even when not squeezing, until a user rotates the handle grip to a new position.

e) Braking or Rotational Transmission

In the tennis racquet embodiment of FIG. 1A previously described, only a portion of brake lining 89 can contact tube 54 when the handle grip is squeezed. Other configurations, however, can provide greater surface contact between opposing component or contact surfaces of the braking system. The embodiments shown in FIGS. 3A, 9A, and 9B, described previously, provide brake contact along most of the length of the handle grip, instead of only the area directly under the user's hand. This is due to many factors including, the longitudinal stiffness of the grip sleeves, sleeve configurations that allow reduction of their circumferences, and elastically deformable rotational glides. FIG. 3A shows sleeve 388 which is thicker and stiffer than the grip sleeves of other embodiments, and has a wide slit down its length. This allows the sleeve to act like a C-ring. When the handle grip is squeezed, the diameter of sleeve 388 is evenly reduced along its entire length as the foam rubber glides are elastically deformed out of the way, thereby allowing maximum contact area of brake surfaces.

In addition to the variations described above, different materials and configurations for the overgrip are possible. Instead of a premolded foam rubber contoured grip such as overgrip 34 in FIG. 1B, the overgrip can be made from a material which can be inelastically deformed prior to use for providing a customized contoured grip. Likewise, a conventional shape of grip, and numerous materials and combinations thereof, can be utilized, including grip surface materials too sticky to be of practical use on conventional stationary handle grips which need to be rotated relative to a user's hand. In addition, a glove, partial glove, or other hand restraining means can be attached to the handle grip. Shown in FIG. 2F is a looped strip of heavy cloth or leather for an index finger 240, a middle finger 242, a ring finger 244, and a thumb 250. These loops, which act to restrain a user's fingers and thumb, are attached to handle grip 211 of FIG. 2E.

CONCLUSIONS, RAMIFICATIONS, & SCOPE OF INVENTION

Accordingly, the reader will see that the invention has one or more of the following advantages over existing handle grips in that:

(a) it is rotatable, yet structurally and operationally very simple;

(b) it improves the performance of many implements;

(c) it is unlikely to jam or fail during use because the hand interface does not lock—rather the brake engages only temporarily, while the hand interface is squeezed;

(d) it increases or amplifies the ease, speed, and accuracy of rotational grip position changes by providing a function separation system for switching from rotation to stopping mode that does not require extraneous movements or depressing of levers;

(e) it selectively amplifies the gripping ability of a hand, using only hand power;

(f) it provides a multitude of possible stepped rotational grip positions, utilizing fewer parts than existing rotatable grips, when incorporating a squeeze actuated tooth meshing system;

(g) it allows an infinite number of stepless rotational grip positions when incorporating a squeeze actuated frictional brake system;

(h) it allows a user to selectively transfer torque or rotational force and motion from the users hand to an implement, and vise versa;

(h) it greatly enhances the ease and speed which beginning level tennis players learn what are common grip positions, what effect different grip positions have on a tennis ball after it is struck—such as its flight path and type of spin, and to switch from one grip position to another;

(k) it helps and encourages tennis players to remember to change their grip positions for different types of shots;

(l) When an ergonometrically contoured surface is incorporated,
it eliminates the need for instruction on how to best grasp the handle grip,
it positions a players hand on the handle grip in precisely the same optimal gripping position every time,
it enables a user to exercise greater control while transmitting more force to an implement,
it reduces the incidence of hand slippage, blisters, hand fatigue, and physical trauma to muscles and joints of a user's gripping hand and arm, and
it amplifies resistance to relative rotation between an implement and a user's hand when the implement's handle grip is squeezed by providing physical barriers to hand movement, thereby enabling a user to employ less hand gripping pressure to effectively use the implement;

(m) it enables a user to sensate the relative rotational position of an implement to his hand;

(n) it allows a user to selectively restrict the range of rotation between an implement and a rotatable handle grip;

(o) it easily, comfortably, and effectively accommodates users that employ a two-handed grip;

(p) it has superior shock absorbing and vibration dampening characteristics;

(q) it is relatively lightweight;

(r) it is relatively inexpensive to manufacture;

(s) it is easy and quick to replace manually; and, (t) it produces a ratcheting effect, yet allows a user to instantly switch between clockwise and counterclockwise directions without moving or depressing any buttons, tabs or levers, and has fewer parts than existing ratcheting tools.

Although the descriptions above contain many specificities, they have been described merely to demonstrate that numerous variations of the invention will present themselves to persons skilled in the art The examples should in no way be construed as limitations of the scope of the invention. The scope of the invention should be determined by the appended claims and their legal equivalents, rather than by the examples given.

What is claimed is:

1. A hand held implement including a handle, said handle comprising:

a handle shaft having inner and outer ends and an outer surface, at least a portion of said outer surface comprising a first braking surface;

a grip sleeve having inner and outer ends and inner and outer surfaces, said grip sleeve at least partially surrounding said handle shaft, said grip sleeve being temporarily deformable from a non-deformed state inwardly towards said handle shaft into a deformed state upon application of manual pressure to said outer surface thereof, retaining means for mounting said grip sleeve for rotation about said handle shaft when said grip sleeve is in its non-deformed state, at least that portion of said inner surface of said grip sleeve opposed to said first braking surface of said handle shaft having a second braking surface thereon;

at least part of said portion of said grip sleeve containing said second braking surface entering into braking engagement with at least part of said first braking surface of said handle shaft to thereby prevent relative rotation between said grip sleeve and said handle shaft upon application of said manually applied squeezing pressure, said second braking surface disengaging from said first braking surface upon release of said manually applied squeezing pressure;

said implement being attached to said handle shaft.

2. The hand held implement of claim 1 wherein said grip sleeve and said handle shaft each have a substantially tubular configuration.

3. The hand held implement of claim 2 wherein said grip sleeve and said handle shaft have longitudinal axes that are substantially coaxial.

4. The hand held implement of claim 3 wherein said tubular grip sleeve is formed of a semi-rigid elastically deformable material, said grip sleeve having a longitudinal slit having opposing longitudinal edges extending from said inner end to said outer end thereof, said opposing edges of said slit adapted to move towards each other when the outer surface of said grip sleeve is manually squeezed to thereby bring said second braking surface into braking engagement with said first braking surface.

5. The hand held implement of claim 1 wherein said retaining means includes rotational glide members located adjacent the inner and outer ends of said grip sleeve.

6. The hand held implement of claim 1 wherein said retaining means are raised glide collars located adjacent each end of said handle shaft.

7. The hand held implement of claim 1 wherein said first and second braking surfaces have first and second coefficients of friction, respectively.

8. The hand held implement of claim 7 wherein said second coefficient of friction is greater than said first coefficient of friction.

9. The hand held implement of claim 1 wherein said second braking surface of said grip sleeve is a high coefficient of friction lining attached to the inner surface of said grip sleeve.

10. The hand held implement of claim 9 wherein said lining is rubber.

11. The hand held implement of claim 1 wherein said implement is selected from the group consisting of sports rackets, rotary hand tools, hockey sticks and kayak oars.

12. The hand held implement of claim 11 wherein said implement is a sports racket having a racket head formed of two arms joined at a throat base, a stationary foam rubber overgrip extending between said throat base and said grip sleeve, and a contoured foam rubber overgrip covering extending over and attached to said grip sleeve.

13. The hand held implement of claim 12 including a tactile indicating means for determining the relative position of said grip sleeve and said racket head without visual inspection.

14. The hand held implement of claim 13 including means for varying resistance to relative rotation between said grip sleeve and said racket head.

15. The hand held implement of claim 14 including end-stopping means for regulating the maximum range of rotation in both the clockwise and counterclockwise directions between said grip sleeve and said handle shaft, said end-stopping means including one or more surfaces on the grip sleeve adapted to strike against one or more opposing surfaces on said handle shaft when the grip sleeve is rotated relative to said handle shaft.

16. The hand held implement of claim 15 wherein said end-stopping means is steplessly adjustable.

17. The hand held implement of claim 11 wherein said implement is a rotary hand tool.

18. The hand held implement of claim 17 wherein said first and second braking surfaces are intermeshing teeth.

19. The hand held implement of claim 17 wherein said rotary hand tool is a screw driver.

20. The hand held implement of claim 17 wherein said rotary hand tool is a socket wrench.

21. The hand held implement of claim 1 wherein at least portions of said handle shaft and said grip sleeve have non-circular cross-sections.

22. The hand held implement of claim 1 wherein said first and second braking surfaces are intermeshing teeth.

23. The hand held implement of claim 1 wherein said second braking surface includes a field of dot glides.

24. The hand held implement of claim 1 wherein said grip sleeve is formed of foam rubber.

* * * * *

UNITED STATES PATENT AND TRADEMARK OFFICE
CERTIFICATE OF CORRECTION

PATENT NO.   : 6,419,601 B1
DATED        : July 16, 2002
INVENTOR(S)  : Allen D. Kenner It is certified that error appears in the above-identified patent and that said Letters Patent is hereby corrected as shown below:

Column 4,
Line 50, change "and" to -- hand --.
Line 60, change "had" to -- hand --.

Column 5,
Line 47, change "ski" to -- skin --.

Column 11,
Line 47, change "dan" to -- than --.
Line 60, change "Dan" to -- than --.

Column 12,
Line 18, change "termite" to -- terminate --.

Column 13,
Line 3, change "boding" to -- bonding --.
Line 32, change "mimor" to -- mirror --.

Column 14,
Line 51, change "0.02" to -- 0.2 --.

Column 15,
Line 41, change "incaesing" to -- increasing --.

Column 18,
Line 67, change "describer Dew" to -- described, there --.

Column 20,
Line 19, change "Big" to -- 275 --.

Column 21,
Line 61, change "7" to -- 7A --.

Column 22,
Line 39, change "Aquatic" to -- Actuation --.

UNITED STATES PATENT AND TRADEMARK OFFICE
CERTIFICATE OF CORRECTION

PATENT NO. : 6,419,601 B1
DATED : July 16, 2002
INVENTOR(S) : Allen D. Kenner

It is certified that error appears in the above-identified patent and that said Letters Patent is hereby corrected as shown below:

<u>Column 26,</u>
Line 62, add the following:

```
--25. A method for learning, teaching and executing different types
of tennis shots using common grip positions for holding a tennis
racquet, and to switch from one grip position to another during
play, comprising:
     providing a handle grip with ergonometric contours;
     providing attachment means for allowing said handle grip to be
rotated on the handle shaft of said racquet while said handle grip
is held with sufficient force to wield said racquet during a game
of tennis;
     providing a squeeze actuated means of preventing said racquet
from rotating relative to said handle grip when said handle grip is
squeezed firmly;
     providing an end-stop means to restrict the range of rotation
that is possible between said racquet and said handle grip;
     providing a tactile indicator means to enable a user to
accurately sensate different rotational grip positions;
     grasping said racquet with two hands, one hand at the throat
region of said racquet and one hand on said handle grip;
     positioning a user's hand on said handle grip via said
ergonometric contours, whereby a need for instruction on how to
best grasp a tennis racquet handle grip is eliminated since said
user's hand is positioned in precisely the same optimal gripping
position every time;
     rotating said racquet about its longitudinal axis relative to
said handle grip;
     sensating relative rotational grip positions via said tactile
indicator means;
     stopping at a desired position selected from the group
consisting of,
          predominant forehand and backhand ground
          stroke grip positions, primarily used for topspin shots
          and occasionally flat strokes, which are attained when
          said racquet is rotated relative to said handle grip in
          a clockwise or counterclockwise direction as far as it
          will go, the range of rotation being restricted by said
          rotational end-stop means,
          a volley or continental grip position,
          primarily used for serves and volleys and slice
          shots, which the user tactually senses when said handle
          grip clicks into position while it is being rotated
          between said predominant ground stroke positions,
          effectuated by said tactile indicator means.
```

UNITED STATES PATENT AND TRADEMARK OFFICE
CERTIFICATE OF CORRECTION

PATENT NO. : 6,419,601 B1
DATED : July 16, 2002
INVENTOR(S) : Allen D. Kenner

It is certified that error appears in the above-identified patent and that said Letters Patent is hereby corrected as shown below:

<u>Column 26 cont'd,</u> alternate rotational grip positions, primarily utilized to control the height or flight path of a particular type of shot, which are determined via said tactile indicator means and by their relationship to said predominant ground stroke positions and said volley position;
  swinging said racquet;
  squeezing said handle grip very firmly just before said racquet contacts a tennis ball, an almost instinctual action, preventing movement between said handle grip and said racquet via said squeeze actuated means;
  hitting said ball;
  whereby learning about different grip positions and their effects on spin and height of shots, changing from one grip position to another, and remembering to use them, is easy.--

Signed and Sealed this

Twenty-eighth Day of October, 2003

JAMES E. ROGAN
*Director of the United States Patent and Trademark Office*